(12) United States Patent
Ross

(10) Patent No.: US 8,589,299 B2
(45) Date of Patent: Nov. 19, 2013

(54) FINANCIAL SERVICE INVOLVING COVERAGE NETWORK

(75) Inventor: Erik Stephen Ross, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/342,088

(22) Filed: Jan. 1, 2012

(65) Prior Publication Data

US 2013/0173468 A1 Jul. 4, 2013

(51) Int. Cl.
G06Q 40/00 (2012.01)

(52) U.S. Cl.
USPC .......................................................... 705/44

(58) Field of Classification Search
USPC .......................................................... 705/44
See application file for complete search history.

(56) References Cited

U.S. PATENT DOCUMENTS

2003/0055738 A1* 3/2003 Alie ................................. 705/26
2012/0022969 A1* 1/2012 Collas et al. ................ 705/26.41

* cited by examiner

*Primary Examiner* — Jessica Lemieux
(74) *Attorney, Agent, or Firm* — Michael A. Springs; Moore & Van Allen PLLC; Nicholas C. Russell

(57) ABSTRACT

In general terms, embodiments of the present invention relate to methods and apparatuses for providing a financial service that involves a coverage network. For example, in some embodiments, a method is provided that includes: (a) receiving transaction information associated with a transaction, where the transaction involves an account and a holder of the account, and where the transaction has a transaction amount; (b) determining, based at least partially on the transaction information, that the account does not have enough available funds or credit to cover the transaction amount; (c) prompting a member of a coverage network to consent to covering at least part of the transaction amount, where the coverage network is associated with the account or the holder, and where the prompting occurs after the determining that the account does not have enough available funds or credit; (d) receiving the member's consent to covering at least part of the transaction amount; and (e) authorizing the transaction based at least partially on the receiving the member's consent.

26 Claims, 7 Drawing Sheets

FINANCIAL SERVICE INVOLVING COVERAGE NETWORK

BACKGROUND

Financial institution customers are constantly looking for new and useful ways to better manage their finances. This is particularly so given that most of today's customers have multiple financial accounts and the consequences associated with mismanaging any one of them can lead to unexpected or unwanted outcomes. For example, a customer may incur an assessment for engaging in a transaction that he mistakenly believes his account can cover. Accordingly, there is a need to provide methods and apparatuses that aid financial institution customers in the management of financial accounts.

SUMMARY OF SELECTED EMBODIMENTS OF THE PRESENT INVENTION

The following presents a simplified summary of the present disclosure in order to provide a basic understanding of some aspects of the invention. This summary is not an extensive or exhaustive overview of the invention. It is not intended to identify key or critical elements of the invention or to delineate the scope of the invention. The following summary merely presents some concepts of the invention in a simplified form as a prelude to the more detailed description provided below.

In general terms, embodiments of the present invention relate to methods and apparatuses for providing a financial service involving a coverage network. For example, some embodiments involve: (a) establishing a coverage network for an account and/or a holder of the account; (b) determining that the account has engaged in a transaction that it cannot cover; (c) prompting one or more members of the coverage network to consent to covering at least part of the transaction (e.g., via a blast message, via individual text messages, and the like); (d) receiving, from a particular member of the coverage network, consent to covering at least part of the transaction; and (e) authorizing the transaction based at least partially on receiving the particular member's consent.

In accordance with some embodiments, the one or more members of the coverage network may be selected by the holder and/or by the financial institution maintaining the holder's account. In some embodiments, the coverage network includes the holder's family members (e.g., mother, father, sister, and the like) and/or close personal friends (e.g., best friends, childhood friends, college roommates, and the like). Also, in some embodiments, each member of the coverage network must consent to being included in the coverage network before that member can actually be added to the coverage network.

In some embodiments, the account holder and the one or more members of the coverage network are all members of the same social network provided by a particular social networking service. In such embodiments, the member(s) may be prompted via a message that is specific to that particular social networking service (e.g., social media wall post, social media direct message, and the like). Additionally or alternatively, in some embodiments, the message: (a) notifies the respective member of the transaction (e.g., identifies the merchant, transaction amount, goods/services being purchased, deficiency, and the like); and/or (b) prompts the member to consent to covering at least part of the transaction (e.g., entire transaction amount, amount of deficiency, amount of related assessment, and the like). The message sent to the member(s) may be sent in real-time and/or while the holder is still standing at the transaction machine (e.g., point-of-sale (POS) device, automated teller machine (ATM), and the like) involved in the transaction.

As such, some embodiments of the present invention enable the holder to establish a coverage network that can help the holder complete transactions that may be necessary, non-discretionary, and/or emergency transactions for the holder. In addition, some embodiments enable each member of the coverage network to provide one-time gifts or microloans to the holder that can be used to cover transactions incurred by the holder. Further, some embodiments enable each member to determine in real-time and/or on a per-transaction basis whether he or she wants to at least partially cover the holder's transaction amounts.

Many embodiments of the present invention described herein involve a member of a coverage network consenting to covering at least part of a transaction amount after the transaction associated with that transaction amount has been initiated. However, it will be understood that other embodiments of the present invention additionally or alternatively enable a member of a coverage network to consent to covering at least part of a transaction amount in advance (i.e., before the transaction associated with that transaction amount is initiated). In such embodiments, the member may consent to covering at least part of the future transaction amount at any time before the future transaction associated with that future transaction amount is initiated. For example, the holder of the account may realize that his account is low on funds in anticipation of making a purchase. In such a case, the holder may ask the member to help him cover that purchase by extending the holder funds (or the promise to extend funds) before the holder actually engages in the purchase transaction. In other words, the holder may request a microloan from the member before (e.g., five minutes before, a week before, and the like) the holder engages in a transaction that the holder knows his or her account cannot cover.

In more general terms, some embodiments of the present invention provide a method that includes: (a) receiving transaction information associated with a transaction, where the transaction involves an account and a holder of the account, and where the transaction has a transaction amount; (b) determining, based at least partially on the transaction information, that the account does not have enough available funds or credit to cover the transaction amount; (c) prompting a member of a coverage network to consent to covering at least part of the transaction amount, where the coverage network is associated with the account or the holder, and where the prompting occurs after the determining that the account does not have enough available funds or credit; (d) receiving the member's consent to covering at least part of the transaction amount; and (e) authorizing the transaction based at least partially on the receiving the member's consent.

In other embodiments, an apparatus is provided that includes: (a) a first communication interface configured to receive, via a payment network, transaction information associated with a transaction, where the transaction involves an account and a holder of the account; (b) a second communication interface configured to communicate with a mobile device via a telecommunications network, where the mobile device is accessible to a member of a coverage network, and where the coverage network is associated with the account or the holder; and (c) a processor operatively connected to the first communication interface and the second communication interface, and configured to: (i) determine, based at least partially on the transaction information, that the account does not have enough available funds or credit to cover the transaction amount; (ii) instruct the second communication interface to send a message to the mobile device via the telecommunications network, where the message prompts the member to consent to covering at least part of the transaction amount, and where the processor instructs the second communication interface to send the message after the processor determines that the account does not have enough available funds or credit; (iii) receive the member's consent to covering at least part of the transaction amount; and (iv) authorize the transaction based at least partially on the processor receiving the member's consent.

In still other embodiments, a computer program product is provided that includes a non-transitory computer-readable medium, where the non-transitory computer-readable medium includes one or more computer-executable program code portions that, when executed by a computer, cause the computer to: (a) receive transaction information associated with a transaction, where the transaction involves an account and a holder of the account; (b) determine that the account will incur a deficiency as a result of the transaction; (c) prompt a member of the account's coverage network to consent to covering at least part of the deficiency, where the computer prompts the member after determining that the account will incur the deficiency; (d) receive the member's consent to covering at least part of the deficiency; and (e) authorize the transaction based at least partially on receiving the member's consent.

In yet other embodiments, another method is provided that includes: (a) prompting a holder of an account to select one or more persons for inclusion in a coverage network, where the coverage network is associated with the account; (b) receiving information indicating that the holder has selected one or more selected persons for inclusion in the coverage network; (c) prompting the one or more selected persons to consent to being included in the coverage network; (d) receiving information indicating that one or more of the one or more selected persons have consented to being included in the coverage network as members; and (e) adding the one or more selected, consenting persons to the coverage network as members.

In still other embodiments, another method is provided that includes: (a) receiving, from a member of a coverage network, consent to covering at least part of a future transaction amount, where the future transaction amount is associated with a future transaction involving an account, where the account is held by a holder, and where the coverage network is associated with the holder or the account; (b) receiving transaction information associated with a transaction, where the transaction has a transaction amount and involves the account, and where the transaction is initiated after the receiving the member's consent; (c) determining that the account does not have enough available funds or credit to cover the transaction amount; and (d) authorizing the transaction based at least partially on the receiving the member's consent.

BRIEF DESCRIPTION OF THE DRAWINGS

Figure 1:
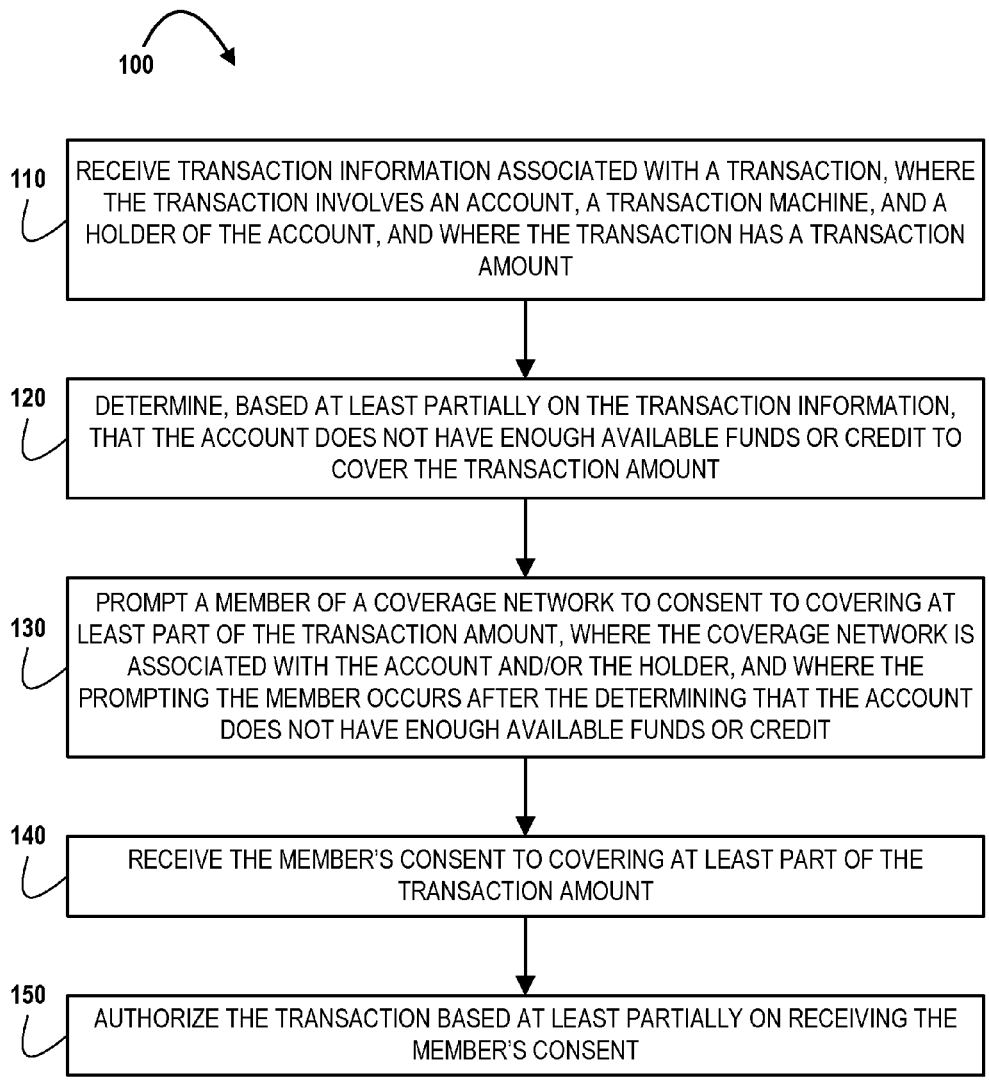
Figure 2:
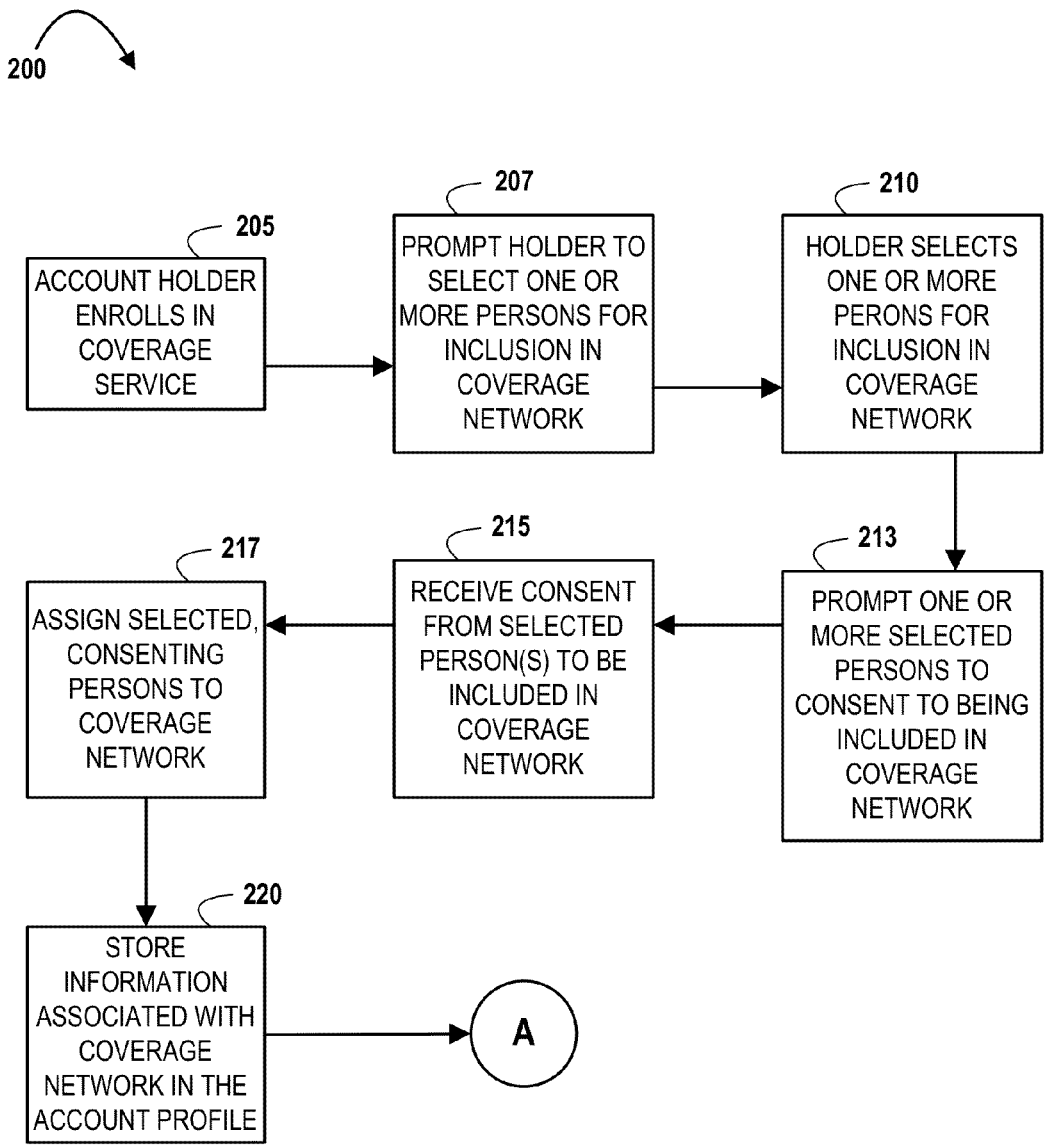
Figure 2A:
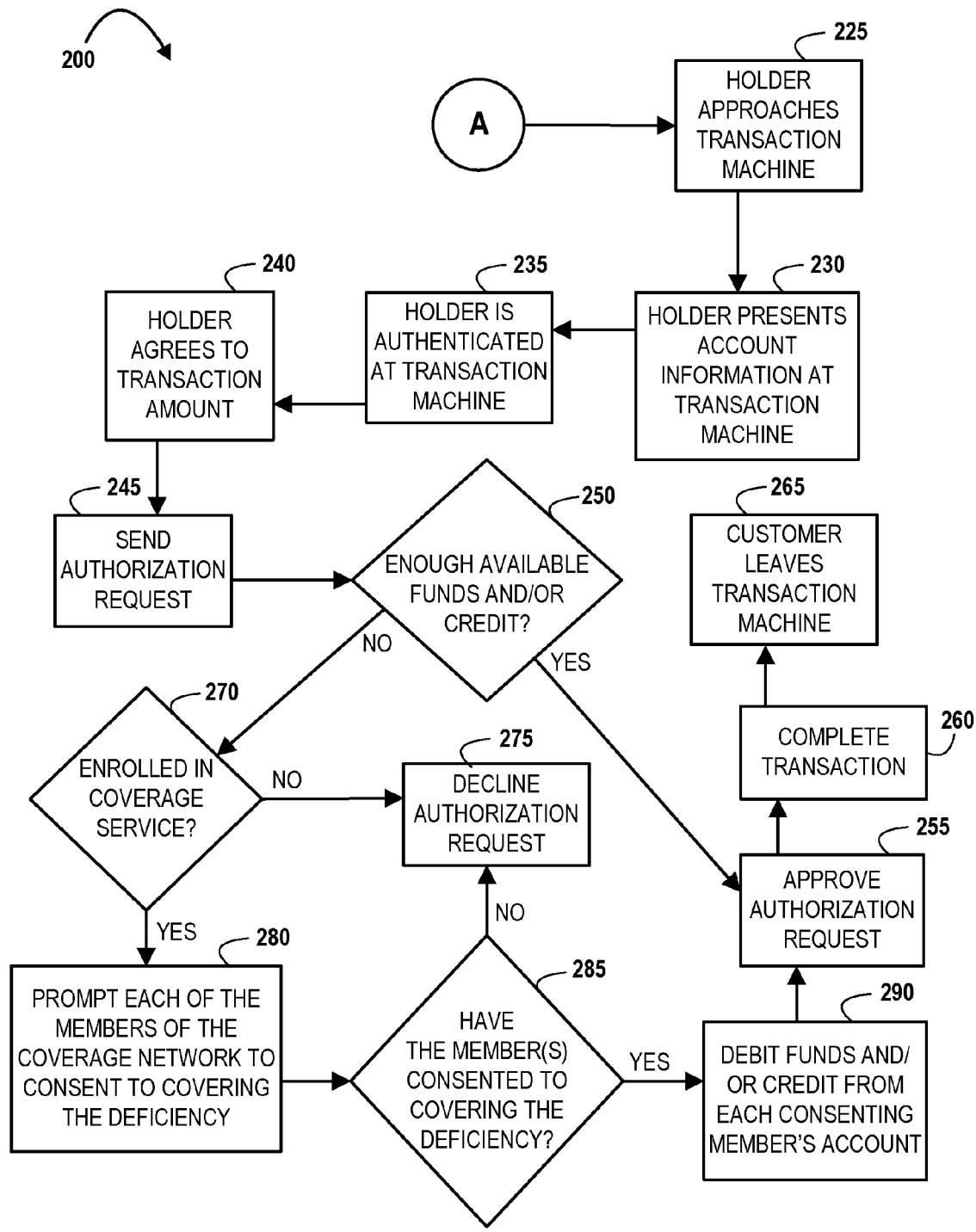
Figure 3:
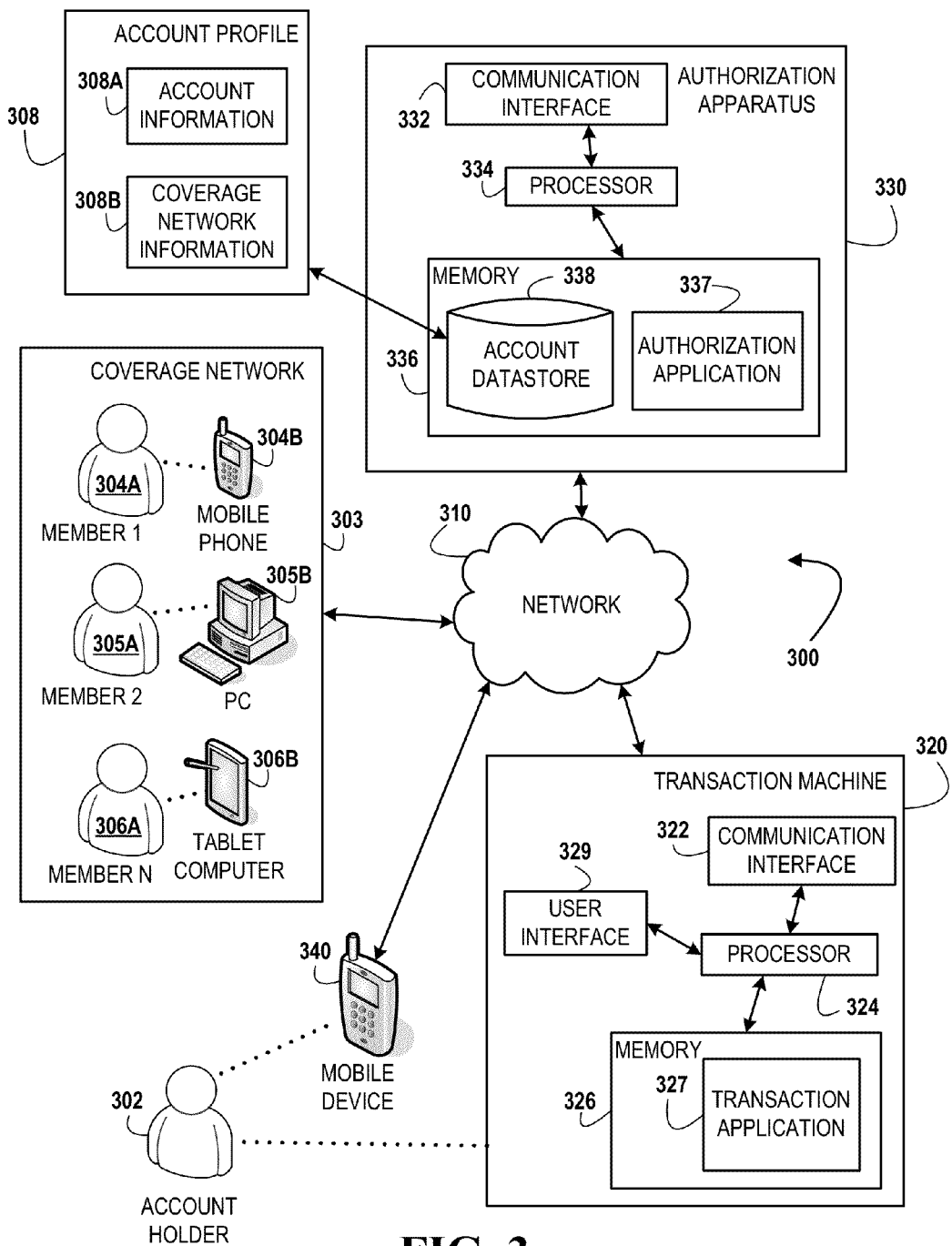
Figure 4:
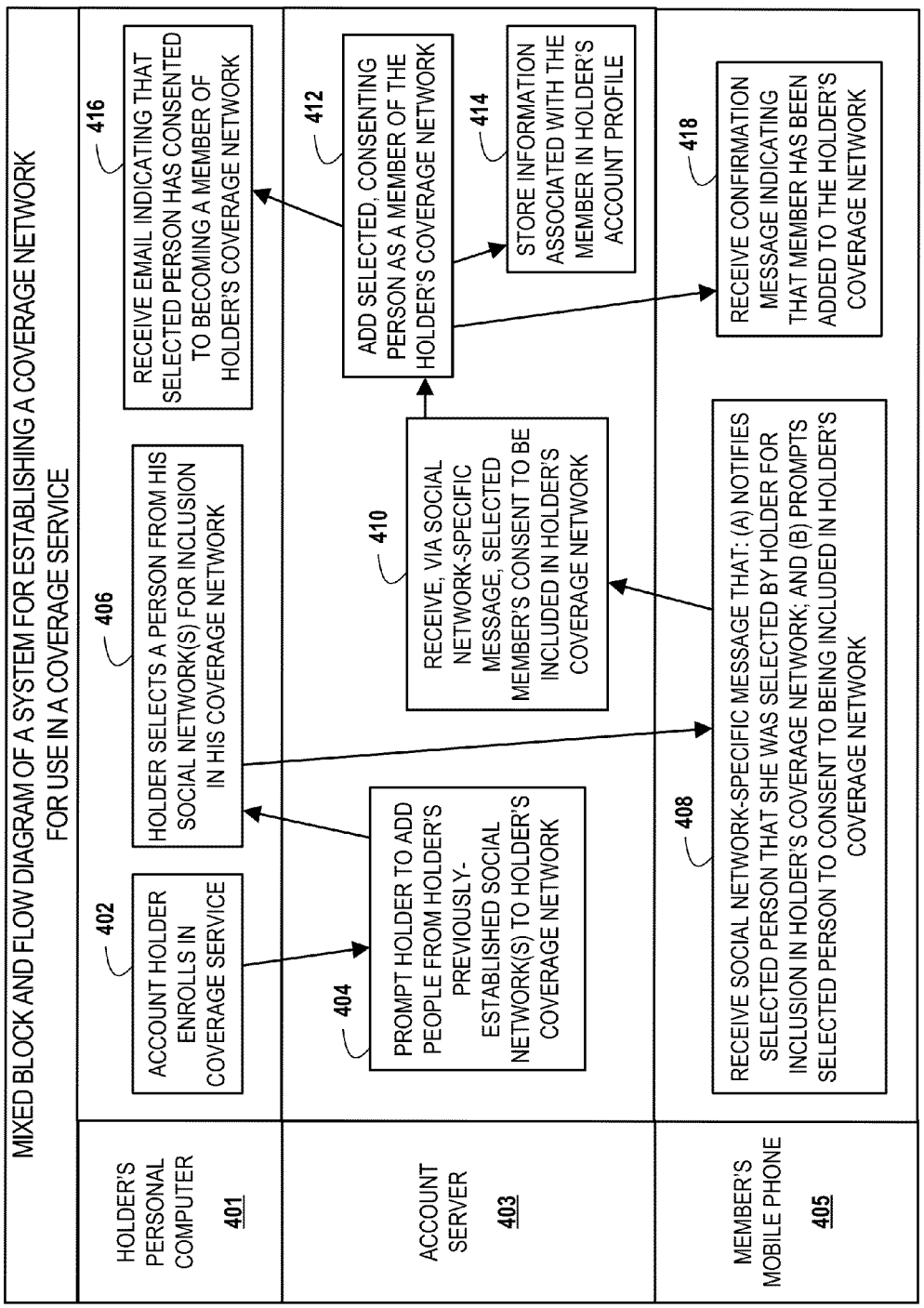
Figure 5:
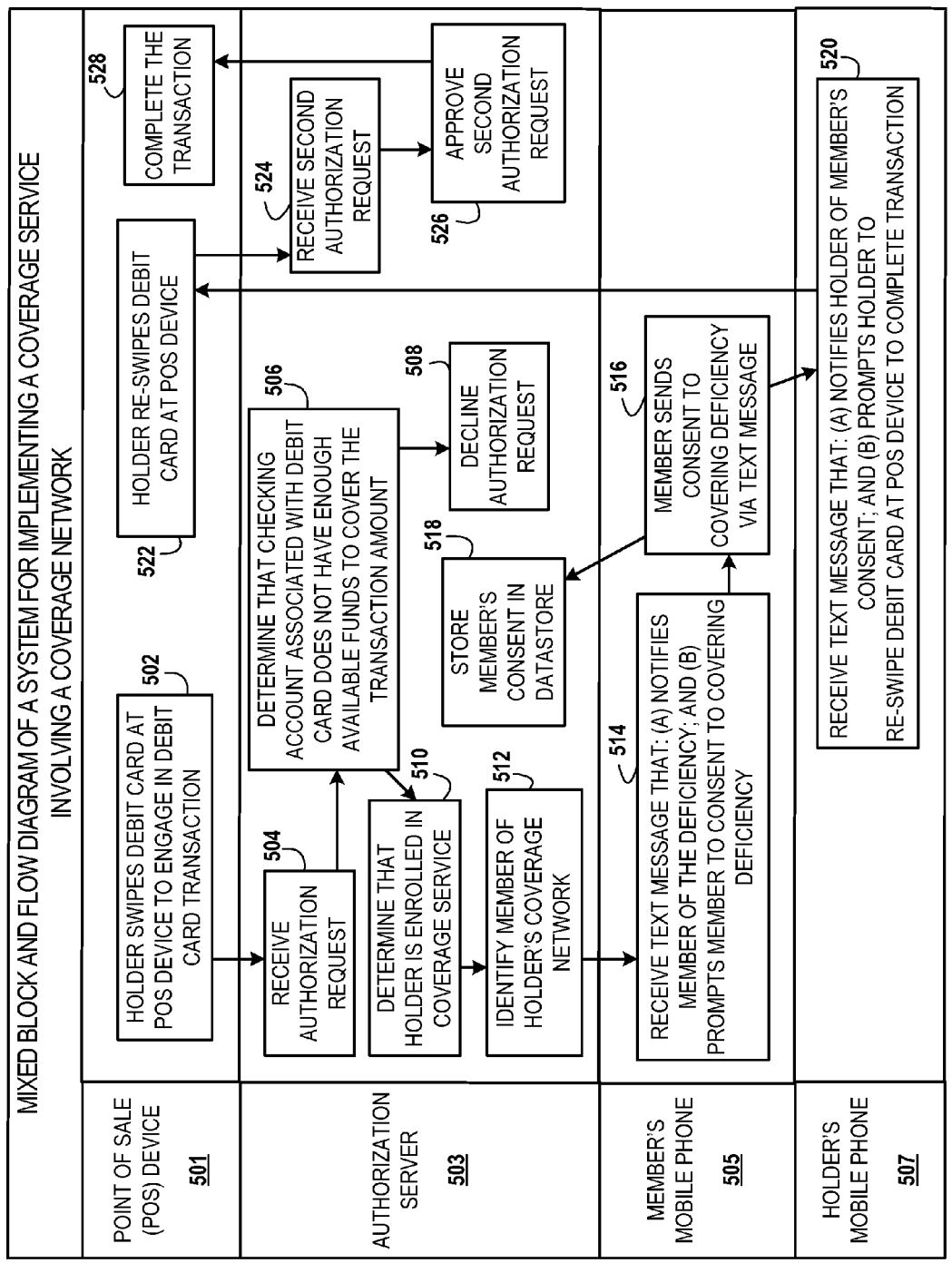
Figure 6:
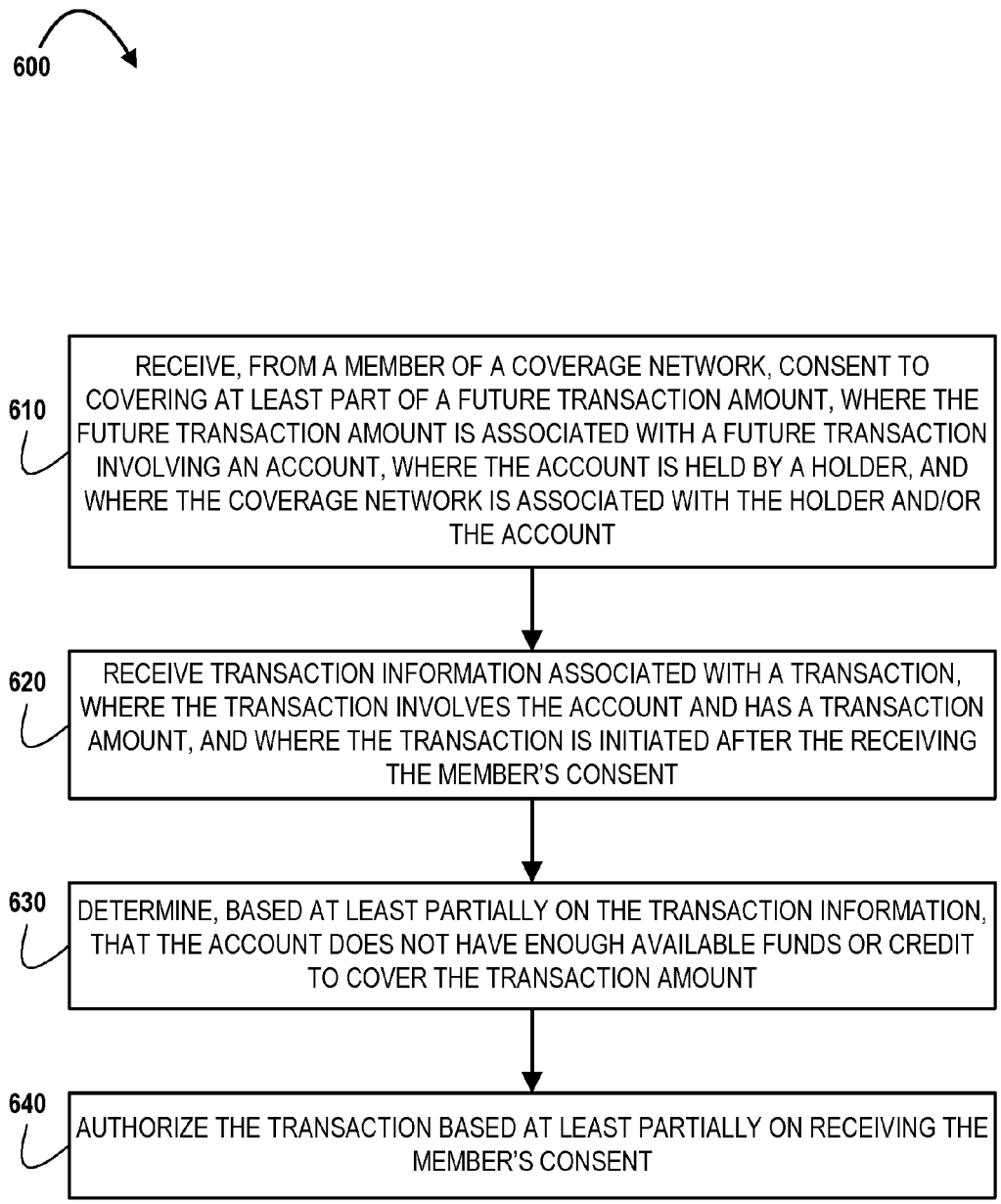

Having thus described some embodiments of the present invention in general terms, reference will now be made to the accompanying drawings, where:

FIG. 1 is a flow diagram illustrating a general process flow for providing a financial service involving a coverage network, in accordance with an embodiment of the present invention;

FIGS. 2-2A is a flow diagram illustrating a more-detailed process flow for providing a financial service involving a coverage network, in accordance with an embodiment of the present invention;

FIG. 3 is a block diagram illustrating technical components of a system for providing a financial service involving a coverage network, in accordance with an embodiment of the present invention;

FIG. 4 is a mixed block and flow diagram of a system for establishing a coverage network for use in a coverage service, in accordance with an embodiment of the present invention;

FIG. 5 is a mixed block and flow diagram of a system for implementing a coverage service involving a coverage network, in accordance with an embodiment of the present invention; and FIG. 6 is a flow diagram illustrating a general process flow for providing a financial service involving a coverage network, where a member of the coverage network consents to covering at least part of a future transaction amount, in accordance with an embodiment of the present invention.

DETAILED DESCRIPTION OF EMBODIMENTS
OF THE PRESENT INVENTION

Referring now to FIG. 1, a general process flow 100 for providing a financial service involving a coverage network is provided, in accordance with an embodiment of the present invention. In some embodiments, the process flow 100 is performed by an apparatus (i.e., one or more apparatuses) having hardware and/or software configured to perform one or more portions of the process flow 100. In such embodiments, as represented by block 110, the apparatus is configured to receive transaction information associated with a transaction, where the transaction involves an account (e.g., a deposit account, a credit account, and the like), a transaction machine (e.g., a POS device, ATM, and the like), and a holder of the account. As represented by block 120, the apparatus is also configured to determine, based at least partially on the transaction information, that the account does not have enough available funds or credit to cover the transaction amount. In addition, as represented by block 130, the apparatus is further configured to prompt a member of a coverage network to consent to covering at least part of the transaction amount, where the coverage network is associated with the account and/or the holder, and where the apparatus prompts the member to consent after determining that the account does not have enough available funds or credit. As represented by block 140, the apparatus is configured to receive the member's consent to covering at least part of the transaction amount. As represented by block 150, the apparatus is further configured to authorize the transaction based at least partially on receiving the member's consent.

For simplicity, it will be understood that the portion of the process flow represented by block 120 is sometimes referred to herein as the "deficiency determination." In addition, it will be understood that, the term "determine," in some embodiments, is meant to have one or more of its ordinary meanings (i.e., its ordinary dictionary definition(s)), but that in other embodiments, that term is meant to have one or more of the ordinary meanings of one or more of the following terms: decide, conclude, verify, ascertain, find, discover, learn, calculate, observe, read, and/or the like. Also, in some embodiments, the phrase "based at least partially on" is meant to have one or more of its ordinary meanings, but in other embodiments, that phrase is meant to have one or more of the ordinary meanings of one or more of the following terms and/or phrases: in response to, after, when, if, as a result of, because of, and/or the like. Further, in some embodiments, the term "via" is meant to have one or more of its ordinary meanings, but in other embodiments, that term is meant to have one or more of the ordinary meanings of one or more of the following terms and/or phrases: from, through, per, with the assistance of, by way of, and/or the like.

It will also be understood that the apparatus having the process flow 100 can include one or more separate and/or different apparatuses. For example, in some embodiments, one apparatus (e.g., the transaction machine 320 described in connection with FIG. 3, and the like) is configured to perform the portion of the process flow 100 represented by block 110, and a second apparatus (e.g., the authorization apparatus 330) is configured to perform the portions represented by blocks 120-150. As still another example, in some embodiments, a single apparatus (e.g., the authorization apparatus 330) is configured to perform each and every portion of the process flow 100. It will also be understood that, in some embodiments, a transaction machine (e.g., the transaction machine 320) is configured to perform one or more (or all) of the portions of the process flow 100, and that in some embodiments, that transaction machine is the transaction machine referred to in block 110.

Regarding block 110, the phrase "transaction machine," as used herein, typically refers to an interactive computer terminal that is configured to initiate, perform, complete, and/or facilitate one or more transactions. Examples of transaction machines include, but are not limited to, ATMs, POS devices (e.g., merchant terminals, and the like), self-service machines (e.g., vending machine, self-checkout machine, ATM, parking meter, and the like), public and/or business kiosks (e.g., an Internet kiosk, ticketing kiosk, bill pay kiosk, and the like), mobile phones (e.g., feature phone, smart phone, and the like), gaming devices, computers (e.g., personal computers, tablet computers, laptop computers, and the like), personal digital assistants (PDAs), and/or the like.

In some embodiments, the transaction machine referred to in block 110 is located in a public place and is available for public use (e.g., on a street corner, on the exterior wall of a banking center, at a public rest stop, and the like). In other embodiments, the transaction machine is additionally or alternatively located in a place of business and available for public and/or business customer use (e.g., in a retail store, post office, banking center, grocery store, and the like). In accordance with some embodiments, the transaction machine is not owned by the user of the transaction machine and/or the holder of the account referred to in block 110. However, in other embodiments, the transaction machine is located in a private place, is available for private use, and/or is owned by the user of the transaction machine and/or the holder referred to in block 110.

Further regarding block 110, the transaction involving the holder and the transaction machine can include any number and/or type of transaction(s) involving a transaction machine. For example, in some embodiments, the transaction includes one or more of the following: purchasing, renting, selling, and/or leasing goods and/or services (e.g., groceries, stamps, tickets, DVDs, vending machine items, and the like); withdrawing cash; making payments to creditors (e.g., paying monthly bills; paying federal, state, and/or local taxes and/or bills; and the like); sending remittances; transferring balances from one account to another account; loading money onto stored value cards (SVCs) and/or prepaid cards; donating to charities; and/or the like.

Also, the account referred to in the process flow 100 can include any number and/or type of account(s). For example, in some embodiments, the account includes a checking account, savings account, money market account, investment account, brokerage account, certificate of deposit account, and/or any other type of deposit account. Of course, it will be understood that embodiments of the present invention may also apply to one or more credit accounts, such as a credit card account, line of credit (LOC) account, store credit account, and/or the like.

In some embodiments, the account, the transaction machine, and the apparatus having the process flow 100 are each controlled, serviced, owned, managed, operated, and/or maintained (collectively referred to herein as "maintained" for simplicity) by a single financial institution. For example, in some embodiments, the apparatus is maintained by a bank, the account is maintained by the bank, the transaction machine is owned by the bank, and the holder and member are customers of the bank. Of course, it will be understood that, in some embodiments, the apparatus, the transaction machine, and/or the account are not maintained by the same financial institution (or any financial institution).

The transaction information referred to in block 110 can be any information that identifies, defines, describes, and/or is otherwise associated with the transaction. Exemplary transaction information includes, but is not limited to, the party (ies) involved in the transaction, the date and/or time of the transaction, the posting date of the transaction, the account(s) involved in the transaction, the transaction amount(s) of the transaction, the good(s) and/or service(s) involved in the transaction (e.g., product names, stock keeping unit (SKU) information, universal product code (UPC) information, and the like), a description of the transaction (which, itself, can include any transaction information, e.g., the description may describe the transaction amount, transaction status, goods involved in the transaction, and the like), and/or the like.

Also regarding block 110, the apparatus having the process flow 100 can be configured to receive the transaction information in any way. For example, in some embodiments, the apparatus is configured to receive an authorization request associated with the transaction, where the authorization request includes the transaction information. In some embodiments, the apparatus is embodied as an authorization apparatus maintained by a financial institution, where the apparatus is configured to consider, approve, and/or decline authorization requests for debit transactions, credit transactions, ATM transactions, POS device transactions, and/or one or more other types of transactions that involve one or more accounts maintained by the financial institution.

In some embodiments, the apparatus having the process flow 100 is configured to receive the transaction information based at least partially on the holder presenting account information (e.g., account number, debit card number, credit card number, credentials, PIN, expiration date of debit card or credit card, card verification value (CVV), name(s) of holder (s) of the account, and the like) at the transaction machine. For example, in some embodiments, the holder presents account information at the transaction machine by swiping a debit card or credit card through the POS device. As another example, in some embodiments, the holder presents account information at the transaction machine by inputting account information into the transaction machine via a user interface associated with the transaction machine. As still another example, in some embodiments, the holder presents account information at the transaction machine by "tapping" a near field communication (NFC)-enabled mobile device at an NFC-enabled transaction machine (e.g., holding the NFC interface of the mobile device within approximately four inches of the NFC interface of the transaction machine, and the like) in order to communicate the account information from the mobile device to the transaction machine.

Additionally or alternatively, the apparatus having the process flow 100 can be configured to receive the transaction information directly or indirectly from the source of the transaction. For example, in some embodiments, the apparatus is located remotely from the transaction machine but is operatively connected to the transaction machine via a network. As another example, the apparatus may include and/or be included in a transaction machine. For example, in some embodiments, the apparatus having the process flow 100 includes the transaction machine referred to in block 110. As another example, in some embodiments, the apparatus having the process flow 100 is embodied as the mobile device referred to in block 130. As still another example, in some embodiments, the apparatus having the process flow 100 is embodied as a transaction machine separate from, and/or different than, the transaction machine and/or mobile device mentioned in the process flow 100.

Regarding block 120, the phrase "transaction amount" is meant to be understood in its broadest sense. In some embodiments, that phrase means the total amount of one or more purchases, draws, assessments, charges, balance transfers, debt obligations, and/or other liabilities incurred, or that will be incurred, by the account as a result of the transaction. Thus, the apparatus having the process flow 100 may be configured to make the deficiency determination by determining that: (a) the total amount of one or more purchases, draws, assessments, charges, balance transfers, debt obligations, and/or other liabilities incurred, or that will be incurred, by the account as a result of the transaction, is greater than (b) the total amount of funds and/or credit available to the account immediately prior to the transaction. The difference between these two amounts is sometimes referred to herein as a "deficiency" or "shortfall." Accordingly, in some embodiments, the apparatus determines that the account does not have enough available funds and/or credit to cover the transaction amount by determining that the account will incur a deficiency (or shortfall) as a result of the transaction.

It will be understood that the apparatus having the process flow 100 can be configured to make the deficiency determination in any way. In some embodiments, the apparatus is embodied as an authorization apparatus (e.g., the authorization apparatus 330 referred to in FIG. 3, and the like) configured to consider, authorize, and/or decline authorization requests and/or financial transactions. The apparatus can be configured to make deficiency determinations in real time and/or substantially real time. In some embodiments, the apparatus is configured to determine whether the account has enough available funds and/or credit immediately or nearly immediately after the transaction has been initiated at the transaction machine (e.g., upon the swipe of a debit or credit card through a POS device, upon the holder selecting an amount to withdraw from an ATM, and the like). However, the apparatus having the process flow 100 can be configured to make the determination at any time from when the holder approaches the transaction machine to when the holder leaves the transaction machine. In other words, the apparatus can be configured to make the deficiency determination after the transaction has been initiated (e.g., at a POS device) but before the transaction has been authorized and/or completed. As such, the apparatus can be configured to make the deficiency determination while the transaction is a present, initiated, and/or pending transaction.

Regarding block 130, the phrase "coverage network," as used herein, generally refers to a group of one or more persons who may be relied upon to at least partially cover a transaction amount incurred by the account and/or by the account holder. In some embodiments, the coverage network is associated with the holder (i.e., the coverage network may not be specific to the account). However, in other embodiments, the coverage network is associated with the account (i.e., the coverage network may not be specific to the holder). In some embodiments, the holder selects the one or more members of the coverage network for inclusion in the coverage network—and/or the member(s) consent to being included in the coverage network—before the transaction referred to in block 110 is initiated.

It will be understood that the member referred to in block 130 is not the holder (or vice versa), but that the member may be anyone else. For example, in some embodiments, the member is a close family member (e.g., mother, father, sister, and the like of the holder) and/or close personal friend (e.g., best friend, childhood friend, college roommate, and the like). Additionally or alternatively, in some embodiments, the member and the holder are members of the same social network provided by a social networking service. In such embodiments, the apparatus having the process flow 100 can be configured to communicate with the member and/or holder via one or more messages specific to the social network and/or social networking service (e.g., social media messages, social media wall postings, social media direct messages, etc.).

Regarding blocks 130 and 140, the phrase "consent to covering at least part of the transaction amount," as used herein, is meant to be understood in its broadest sense. For example, in some embodiments, that phrase means the member consents to: (a) covering at least part of the total purchase amount of the transaction; (b) covering at least part of the deficiency that would result from the transaction; (c) covering at least part of an assessment associated with incurring the deficiency; (d) covering at least part of an assessment associated with using the coverage network; (e) one or more terms of the financial service involving the coverage network; (f) using the coverage network for this transaction (i.e., the transaction referred to in block 110); and/or the like. Thus, in some embodiments, the phase "transaction amount" refers to the total amount of every liability incurred, or that would be incurred, as a result of the transaction. However, in other embodiments, the phrase "transaction amount" refers only to the deficiency that would result from the transaction. In still other embodiments, the phrase "transaction amount" refers only to an assessment associated with using the coverage network and/or the financial service involving the coverage network.

Additionally or alternatively, in some embodiments, the phrase "consent to covering at least part of the transaction amount" generally refers to the action of agreeing, promising, and/or otherwise consenting to pay, guarantee, and/or otherwise cover at least part of the transaction amount incurred by the account before, during, or after the transaction is authorized. For example, in some embodiments, the member consents to covering at least part of the transaction amount by promising, before the transaction is authorized, to pay 50% of the deficiency that would result from the transaction. In such embodiments, as a result of receiving the member's consent, the apparatus may debit an account held by the member for 50% of the deficiency and may do so at any time (e.g., before the transaction is authorized, after the transaction is authorized, and the like). As another example, in some embodiments, the member consents to covering at least part of the transaction amount by consenting to paying the entire transaction amount (e.g., the total amount of any purchase transactions, assessments, and/or liabilities incurred as a result of the transaction). In such embodiments, the apparatus can be configured to charge the entire transaction amount to the member's account at any time.

As another example, in some embodiments, the member consents to covering at least part of the transaction amount by agreeing to pay the transaction amount only if the holder does not do so within a predetermined period of time (e.g., two days, by the end of the week, by the end of the month, and the like). Thus, in some embodiments, the member may consent to becoming secondarily liable for, and/or a guarantor, co-signor, and/or surety for, at least part of the transaction amount. However, in other embodiments, the member may consent to becoming primarily and/or solely liable for at least part of the transaction amount.

Specifically regarding block 130, the prompting the member may include sending and/or presenting one or more questions, instructions, requests, messages, graphics, sounds, phone calls, text messages (e.g., SMS messages, MMS messages, EMS messages, and the like), actionable alerts, instant messages, voice messages, voice recordings, interactive voice response (IVR) communications, pages, emails, communications specific to one or more social networking services, communications specific to one or more electronic banking services (e.g., online banking, mobile banking, text banking, and the like), and/or the like. For example, in some embodiments, the apparatus having the process flow 100 is configured to send a text message to a mobile phone accessible to the member. As another example, in some embodiments, the apparatus sends an email to a personal computer accessible to the member, where the email invites the member to use an input feature included in the email (e.g., digital selectable button) to provide the member's consent.

As still another example, in some embodiments, the apparatus having the process flow 100 is configured to send a social media direct message to the member that prompts the member to consent to covering at least part of the transaction amount. In such embodiments, the member may indicate his consent via a return social media direct message. As another example, in some embodiments, where the member of the coverage network is also a social media friend of the holder, the apparatus is configured to post a message to the wall of the holder's social media account, such that each of the holder's social media friends (including the member) may view the message and/or be prompted to cover at least part of the transaction amount. In other embodiments, instead of a social media wall posting, the message is a social media message that is posted to the holder's social media feed, such that each of the holder's social media followers (which may include the member) may view the message and/or be prompted to cover at least part of the transaction amount.

In some embodiments, the prompting the member to consent includes presenting information to the member that describes, defines, identifies, and/or is otherwise associated with the transaction and/or transaction amount referred to in blocks 110 and 120. For example, in some embodiments, the apparatus is configured present information to the member that: (a) describes the transaction (e.g., transaction amount, goods purchases, location and/or identity of the counterparty, and the like); (b) notifies the member of the deficiency; and/or (c) prompts the member to consent to covering at least part of the transaction amount. In some embodiments, the information notifies the member that the transaction, if completed, will result in the deficiency. As another example, in some embodiments, the information notifies the member that one or more payments may be assessed (e.g., to the holder, member, account, and the like) if the transaction is completed and/or if the deficiency is not cured before the end of the day. As another example, in some embodiments, the information identifies the available balance and/or available credit for the holder's account, the transaction amount of the transaction, the amount of the deficiency, the amount of the assessment(s) associated with incurring the deficiency, and/or the like. In some embodiments, the information associated with the transaction and/or transaction amount may be presented to the member at the same time as the apparatus prompts the member to consent to covering at least part of the transaction amount. In other embodiments, the information is presented in a separate, different, earlier, and/or later communication.

Still regarding block 130, the apparatus can be configured to prompt the member via any apparatus (e.g., personal computer, mobile phone, and the like) maintained and/or accessible to the member. In some embodiments, the apparatus prompts the member via a mobile device that is carried by the member at the time of the transaction referred to in block 110. Exemplary mobile devices include mobile phones (e.g., feature phones, smart phones, and the like), mobile gaming devices, mobile computers (e.g., tablet computers, laptop computers, and the like), personal digital assistants (PDAs), and/or the like. In some embodiments, the mobile device carried by the member is configured to send and/or receive communications (e.g., phone calls, text messages, actionable alerts, emails, social network-specific messages, and the like), present information via a user interface, play video games, and/or the like. In some embodiments, the mobile device is portable (e.g., not stationary) and/or can be carried and/or worn by and/or on a person (e.g., the member).

In some embodiments, the member's name and/or contact information is stored in a datastore and/or associated with the holder and/or the holder's account. For example, in some embodiments, the member's contact information is stored in an account profile associated with the holder's account. In some embodiments, the member provides his contact information to a financial institution that maintains the apparatus having the process flow 100, for example, when the member consents to being included in the holder's coverage network and/or before the apparatus receives the transaction information. Exemplary contact information includes, but is not limited to, phone numbers, text messaging service addresses, email addresses, social network-specific addresses (e.g., username and/or other identifier for a social media account), electronic banking-specific addresses (e.g., username and/or other identifier for online banking, mobile banking, text banking, and the like). Exemplary contact information may also include subscriber identity module (SIM) card information, serial numbers, and/or IP addresses associated with a mobile device.

Regarding block 140, the member may consent to covering at least part of the transaction amount in any way. In some embodiments, the member consents to covering the at least part of transaction amount via a mobile device accessible to the member. For example, the member may consent to covering the transaction amount by using one or more input features (e.g., physical and/or digital buttons, microphones, and the like) provided by the mobile device and/or by a mobile banking application that executes on the mobile device. As another example, in some embodiments, the member consents to covering the transaction amount by sending an SMS message (e.g., where the SMS message includes the term "Yes" and/or "Consent," and the like) from the member's mobile device to the apparatus having the process flow 100. In other embodiments, however, the member may consent to covering at least part of the transaction amount via some other apparatus. For example, in some embodiments, after being prompted, the member consents to covering the transaction amount by using one or more hardware and/or software input features provided by the personal computer and/or by an application executing on the computer. Also, it will be understood that the member may be prompted to consent to covering at least part of the transaction amount via a first channel (e.g., a mobile device) and then provide his consent to covering at least part of the transaction amount via a second channel (e.g., a personal computer). Further, it will be understood that, in some embodiments, the member's consent is valid only for the deficiency, transaction amount, and/or transaction referred to in the process flow 100, but not for any future deficiencies, transaction amounts, and/or transactions (i.e., the member will have to give consent to those future transaction amounts, deficiencies, and/or transactions when they occur).

Regarding block 150, the apparatus can be configured to authorize the transaction in any way. For example, in some embodiments, the apparatus is configured to send, to the transaction machine referred to in the process flow 100, one or more instructions to complete (and/or for completing) the transaction. In some embodiments, the apparatus is configured to authorize the transaction by approving an authorization request associated with the transaction. In some embodiments, the authorization request approved by the apparatus having the process flow 100 was included in the transaction information referred to in block 110. In some embodiments, where the transaction machine referred to in block 110 is the apparatus having the process flow 100, the transaction machine authorizes and/or completes the transaction in response to receiving the member's consent. In such embodiments, the transaction machine completes the transaction by performing one or more meaningful actions relevant to the transaction, such as, for example, dispensing cash, accepting a purchase transaction, accepting a check deposit, printing a receipt and/or statement, loading a prepaid card with funds, transferring funds, and/or the like. In some embodiments, these one or more actions constitute the exchange central to the transaction, define the transaction, are desired by the holder to be performed, and/or were the reason the holder arrived at the transaction machine in the first place.

In some embodiments, the apparatus is configured to authorize the transaction, even if the member consents to covering only part of the transaction amount (and/or deficiency) and not the entire transaction amount (and/or deficiency). In such embodiments, the member's account may be debited for the consented-to amount, and the remaining portion of the transaction amount (and/or deficiency) may be funded by the financial institution maintaining the holder's account. However, in other embodiments, the apparatus having the process flow 100 will not authorize the transaction unless the member consents to covering the entire transaction amount (and/or deficiency). In other embodiments, the apparatus is configured to authorize the transaction if the member and one or more other members of the coverage network collectively consent to covering the entire transaction amount (and/or deficiency). For example, in some embodiments, the apparatus will authorize the transaction if three members of the coverage network each consent to covering one third of the transaction amount (and/or deficiency), such that the entire transaction amount (and/or deficiency) is covered by the coverage network.

In some embodiments, the apparatus configured to perform the process flow 100 is configured to perform one or more (or all) of those process flow portions at some point after the holder approaches the transaction machine for the transaction and before the holder leaves the transaction machine. In some embodiments, this means that the apparatus is configured to perform one or more (or all) of the portions represented by blocks 110-150 (e.g., make the deficiency determination, prompt the member of the coverage network to consent to covering at least part of the transaction amount, receive the member's consent, and the like) during the transaction involving the transaction machine and the holder, and/or while the holder is still at the transaction machine. As such, embodiments of the present invention enable the member of the coverage network to make real time, per-transaction decisions regarding whether the member wants to consent to covering at least part of the transaction amount. In addition, embodiments of the present invention may also enable the holder to engage in deficiency transactions relatively discreetly, thereby avoiding any potential embarrassment associated with the deficiency and/or the like. Still further, embodiments of the present invention may further enable the holder to engage in emergency transactions that, without the support of the coverage network, may otherwise be declined for lacking enough available funds and/or credit.

Also, the apparatus having the process flow 100 can be configured to perform any of the portions of the process flow 100 represented by blocks 110-150 upon or after one or more triggering events (which, in some embodiments, is one or more of the other portions of the process flow 100). As used herein, a "triggering event" refers to an event that automatically (i.e., without human intervention) triggers the execution, performance, and/or implementation of a triggered action, either immediately, nearly immediately, or sometime after (e.g., within minutes, and the like) the occurrence of the triggering event. For example, in some embodiments, the apparatus is configured such that the apparatus making the deficiency determination (the triggering event) automatically and immediately or nearly immediately (e.g., within 3-30 seconds, and the like) triggers the apparatus to prompt the member to consent to covering at least part of the transaction amount (the triggered action(s)). In some embodiments, the apparatus is additionally or alternatively configured to authorize and/or complete the transaction (triggered action) automatically and immediately or nearly immediately after receiving the member's consent to covering at least part of the transaction amount (triggering event).

In some embodiments, the apparatus having the process flow 100 is configured to automatically perform one or more portions of the process flow 100 represented by blocks 110- 150, whereas in other embodiments, one or more of the portions of the process flow 100 represented by blocks 110-150 require and/or involve human intervention (e.g., a user operating the apparatus configured to perform the process flow 100, and the like). In addition, it will be understood that, in some embodiments, the apparatus configured to perform the process flow 100 (and/or a user thereof) is configured to perform one or more portions (or combinations of portions) of the process flow 100, from start to finish, within moments, seconds, and/or minutes (e.g., within approximately 1-5 minutes from start to finish, and the like). As an example, in some embodiments, the apparatus having the process flow 100 is configured to authorize and/or complete the transaction within moments, seconds, and/or minutes (e.g., within approximately two minutes) of: (a) receiving the transaction information associated with the transaction; and/or (b) determining that the account does not have enough available funds and/or credit to cover the transaction amount.

It will be understood that the apparatus having the process flow 100 can be configured to perform one or more portions of any embodiment described and/or contemplated herein, such as, for example, one or more portions of the process flow 200 described herein, one or more portions of the process flows described in connection with FIGS. 4 and/or 5, and/or one or more portions of the process flow 600 described herein in connection with FIG. 6. Also, the number, order, and/or content of the portions of the process flow 100 are exemplary and may vary. For example, in some embodiments, the apparatus having the process flow 100 is configured to assess an assessment to the account, to the holder, to the member, and the like, where the assessment is based at least partially on the account incurring a deficiency, where the amount of the assessment is based at least partially on the amount of the deficiency, and/or where the assessment is assessed after authorizing and/or completing the transaction. In some embodiments, the apparatus is configured to: (a) assess the account an assessment based at least partially on the apparatus determining that the account settled negative at the end of the day in which the transaction occurred; and/or (b) determine not to assess the account an assessment based at least partially on the apparatus determining that the account settled non-negative (e.g., the account has a zero or positive available balance, and the like) at the end of the day in which the transaction occurred.

As another example, in some embodiments, the apparatus is configured to store (e.g., in a datastore, in an online banking account, and the like) the member's consent to covering at least part of the transaction amount, which may, in some embodiments, be required by one or more government and/or financial institution regulations. Also, in some alternative embodiments, before authorizing the transaction, the apparatus may notify the holder of the deficiency and/or prompt the holder to consent to completing the transaction. In such embodiments, the holder may consent to completing the transaction in any way. For example, in some embodiments, the holder consents by re-presenting account information at the transaction machine (e.g., re-swiping a debit or credit card). It will be understood that, by consenting to completing the transaction, the holder also consents, either explicitly or implicitly, to incurring the deficiency, to one or more terms of the financial service, to incurring an assessment for using the financial service and/or for incurring the deficiency, to completing the transaction, and/or the like. In other embodiments, the apparatus is configured to notify the holder of the deficiency, enable the holder to prevent the member or any other member of the coverage network from being notified about the deficiency, and/or enable the holder to decline the transaction, all during the transaction and/or at the transaction machine.

As still another example, in some embodiments, the apparatus is configured to place a time limit on receiving the member's consent. For example, in some embodiments, if the apparatus does not receive the member's consent within two minutes of prompting the member, then the apparatus is configured to decline the transaction and/or prompt another member of the coverage network to at least partially cover the transaction amount. (In some embodiments, however, all of the members of the coverage network are prompted at the same time; thus, if no member consents within the predetermined period of time, the apparatus will decline the transaction.) As another example, in some embodiments, the apparatus having the process flow 100 is configured to debit and/or assess the member's account for the transaction amount (or consented-to part of the transaction amount), either before or after the apparatus authorizes the transaction.

Referring now to FIGS. 2 and 2A, a more-detailed process flow 200 for providing a financial service involving a coverage network is provided, in accordance with an embodiment of the present invention. It will be understood that the process flow 200 illustrated in FIG. 2 represents an example embodiment of the process flow 100 described in connection with FIG. 1. Thus, in some embodiments, the apparatus that is configured to perform the process flow 200 is also configured to perform the process flow 100 (and/or vice versa). Also, in some embodiments, the process flow 200 is performed at least partially by an apparatus having hardware and/or software configured to perform one or more portions of the process flow 200. Further, in some embodiments, the apparatus having the process flow 200 is maintained by a bank for the benefit of its customers. Also in accordance with some embodiments, the account holder referred to in the process flow 200 is the user of the transaction machine and a customer of the bank. In addition, the account referred to in the process flow 200 is an account held by the account holder and maintained by the bank.

As represented by block 205, the account holder enrolls in a bank coverage service that uses a coverage network. (In some embodiments, the bank coverage service is the same financial service referred to in connection with the process flow 100 and/or FIG. 1.) As represented by block 207, the apparatus having the process flow 200 is configured to prompt the holder to select one or more persons for inclusion in the coverage network. It will be understood that the holder may prompted in any way. Also, the apparatus may prompt the holder to select anyone for inclusion. For example, in some embodiments, the apparatus is configured to prompt the holder to select one or more persons who are family members or close personal friends of the holder. As another example, in some embodiments, the apparatus prompts the holder to add people from the holder's one or more previously-established social networks to his coverage network. In some embodiments, the apparatus prompts the holder by presenting a user interface to the holder, where the user interface presents one or more predetermined persons for selection and enables the holder to select those one or more presented persons for inclusion. However, in other embodiments, the user interface merely asks the holder to: (a) identify one or more persons for inclusion in the coverage network; and (b) provide contact information for those one or more identified persons.

After being prompted, the holder selects one or more persons for inclusion in the coverage network, as represented by block 210. Thereafter, the apparatus is configured to prompt the one or more selected persons to consent to being included in the coverage network, as represented by block 213. Again, it will be understood that the selected person(s) may be prompted in any way. In some embodiments, the apparatus prompts the selected persons by sending each of them a message that: (a) notifies the selected person that he or she was selected by the holder for inclusion in the coverage network; and (b) prompts the selected person to consent to being included in the coverage network. In some of these embodiments, the message is a social network-specific message (e.g., social media message, social media direct message, and the like). In some embodiments, the message includes one or more terms of the coverage service, and in some embodiments, the member(s) are required to agree to these one or more terms before being added to the coverage network.

After prompting the selected person(s), the apparatus is configured to receive consent from one or more of the selected person(s) to be included in the coverage network, as represented by block 215. Although not shown, the apparatus having the process flow 200 can also be configured to receive one or more indications from those selected person(s) who do not consent to being included the coverage network. After determining which of the selected persons have consented to being included in the coverage network, the apparatus is configured to assign each of the selected, consenting persons to the coverage network as members of the coverage network, as represented by block 217.

In addition, the apparatus is configured to store information associated with the coverage network in the account profile associated with the account, as represented by block 220. For example, in some embodiments, the apparatus may store each member's name and contact information (e.g., phone number, address, email address, and the like) in the account profile. Additionally or alternatively, in some embodiments, the apparatus may store the member's account information (e.g., routing number, account number, account password, and the like), so that the member's account may be debited if the member later consents to covering at least part of a transaction amount (and/or deficiency) incurred by the holder's account. Of course, it will be understood that some or all of the information about the member(s) and/or the coverage network may not be publicly available or even available to the holder. For example, in some embodiments, the member's account number is viewable only by bank personnel and not by the holder (or anyone else).

Referring now to FIG. 2A, sometime after the coverage network has been established, the holder approaches a transaction machine for the purpose of engaging in a transaction using that transaction machine, as represented by block 225. As represented by block 230, the holder presents account information at the transaction machine. For example, in some embodiments where the transaction machine is a POS device, the holder may swipe a debit and/or credit card associated with the account through the POS device in order to communicate account information associated with the account to the POS device and/or to the apparatus having the process flow 200. As another example, in some embodiments where the transaction machine is a personal computer, the holder may input account information into a web page associated with the transaction that is displayed at the personal computer. After the account information is presented, the transaction machine (and/or the apparatus having the process flow 200) identifies and/or authenticates the holder, as represented by block 235. In some embodiments, the transaction machine authenticates the holder based at least partially on the account information (e.g., userid/password, PIN, checkcard, account number, and the like) the holder presents to the transaction machine.

After being authenticated, the holder selects the transaction and/or agrees to the transaction amount, as represented by block 240. Then, as represented by block 245, the transaction machine sends an authorization request to the apparatus having the process flow 200, where the authorization request identifies and/or describes the transaction, the holder, the account, the transaction amount, and/or the like. Upon receiving the authorization request, the apparatus must determine whether the account has enough available funds and/or credit to cover the transaction amount, as represented by block 250. If so, then the apparatus, as represented by blocks 255-260, approves the authorization request and/or instructs the transaction machine to complete the transaction. After the transaction is completed at the transaction machine, the customer leaves the transaction machine, as represented by block 265.

However, if the apparatus having the process flow 200 determines that the account does not have enough available funds and/or credit to cover the transaction amount, then the apparatus is configured to determine whether the customer is enrolled in the coverage service provided by the bank, as represented by block 270. If the customer is not enrolled in the coverage service, then the apparatus having the process flow 200 (and/or the transaction machine) is configured decline the authorization request and/or otherwise decline, cancel, abort, and/or reject the transaction, as represented by block 275. Thus, in this example embodiment, the coverage service cannot be used to complete the transaction if the holder is not already enrolled in the coverage service prior to the transaction being initiated.

However, if the apparatus determines that the customer is enrolled in the coverage service, then the apparatus is configured to prompt each of the members of the coverage network to consent to covering, either individually or collectively, the deficiency, as represented by block 280. For example, in some embodiments, the apparatus accesses the holder's account profile to retrieve contact information (e.g., phone number, email address, social media account, social media handle, and the like) for each member, and then the apparatus sends a message (e.g., text message, email, social media wall posting, social media direct message, and the like) to each member that: (a) describes the transaction, transaction amount, the total amount of the holder's currently available funds and/or credit, the deficiency, and the like; and/or (b) prompts the member to consent to covering at least part of the deficiency. In some embodiments, the apparatus is configured to prompt the one or more members to consent to covering at least part of the deficiency within approximately fifteen seconds of the apparatus determining that the account does not have enough available funds and/or credit to cover the transaction amount.

After prompting the member(s) to consent, the apparatus having the process flow 200 is configured to determine whether the member(s) have consented, either individually or collectively, to covering the deficiency, as represented by block 285. In some embodiments, if no member has consented within a predetermined period of time (e.g., two minutes, five minutes, and the like), then the apparatus is configured to decline the authorization request, as represented by block 275. Additionally or alternatively, if each of the members indicates that he or she does not consent to covering the deficiency within the predetermined period of time, then the apparatus may also be configured to decline the authorization request. Further, in some embodiments, if one or more members of the coverage network have consented to covering part of the deficiency, but if the total consented-to amount is not enough to cover the entire deficiency, then the apparatus may be configured to decline the transaction. For example, in some embodiments, where the deficiency is $30, where a first member of the coverage network consents to covering $10, where a second member consents to covering $15, and where no other member of the coverage network has consented to covering at least part of the deficiency, the apparatus may be configured to decline the transaction because the total consented-to amount is less than the deficiency (i.e., $10+$15=$25<$30). The apparatus could be configured similarly if the total consented-to amount is less than the total transaction amount.

However, if one or more members of the holder's coverage network consent to covering the deficiency, either individually or collectively, then the apparatus is configured to debit funds and/or credit from each consenting member's account by their consented-to amounts and/or by the amount of any related assessment associated with the deficiency and/or the transaction, as represented by block 290. Also after receiving each member's consent, the apparatus is configured to approve the authorization request and otherwise complete the transaction, as represented by blocks 255-260. Again, once the transaction is completed, the customer leaves the transaction machine, as represented by block 265. It will be understood that, in accordance with some embodiments, one or more portions of the process flow 200 may comply with one or more requirements of a government regulation (e.g., Regulation E and/or the CARD Act in the United States, and the like). For example, in some embodiments, receiving the consent of one or more members to covering the deficiency, as represented by the "Yes" arrow between blocks 285 and 290, may comply with one or more consent requirements of a government regulation.

Of course, it will also be understood that the embodiment illustrated in FIG. 2 is merely exemplary and that other embodiments may vary without departing from the scope and spirit of the present invention. For example, in some embodiments, the apparatus having the process flow 200 is additionally configured to prompt the holder (e.g., via the mobile device, via the transaction machine, and the like) to consent to completing the transaction. As another example, in some embodiments, the apparatus is configured to send a confirmation message to each consenting member, where the message confirms each consenting member's consent to at least partially covering the deficiency. As still another example, in some embodiments, the apparatus is configured to provide funds and/or credit (e.g., to the holder, to the relevant counterparty, and the like) adequate to complete the transaction before debiting each consenting member's account. Further, although not shown, the apparatus having the process flow 200 may be configured to store each consenting member's consent in a datastore (e.g., computer-readable memory, and the like) in order to, for example, comply with a government regulation. Also, it will be understood that the apparatus may be configured to debit each member's account after approving the authorization request instead of before approving the authorization request.

In addition, the apparatus having the process flow 200 can be configured to perform one or more portions of the process flow 200 in real time, in substantially real time, and/or at one or more predetermined times. The apparatus having the process flow 200 may be configured to perform any of the portions of the process flow 200 represented by blocks 205-290 upon or after one or more triggering events (which, in some embodiments, is the performance of one or more of the other portions of the process flow 200). In addition, in some embodiments, the apparatus having the process flow 200 (and/or a user thereof) is configured to perform each portion of the process flow 200, from start to finish, within moments, seconds, and/or minutes (e.g., within approximately 1-5 minutes, and the like).

Referring now to FIG. 3, a system 300 for providing a financial service involving a coverage network is provided, in accordance with an embodiment of the present invention. As illustrated, the system 300 includes a network 310, a transaction machine 320, an authorization apparatus 330, and a mobile device 340. FIG. 3 also shows an account holder 302 and an account profile 308. The account profile 308 includes account information 308A and coverage network information 308B, and is associated with an account (e.g., credit account, deposit account, and the like) that is held by the holder 302. In addition, FIG. 3 also shows the coverage network 303, which is associated with the account and/or holder 302. The coverage network 303 includes a plurality of members, as represented by member 1 304A, member 2 304A, and member N 304A. As shown, member 1 304A has access to the mobile phone 304B, member 2 305A has access to the personal computer (PC) 305B, member N 306A has access to the tablet computer 306B, and the holder 302 has access to the mobile device 340 and to the transaction machine 320.

In some embodiments, one or more (or all) of the members of the coverage network 303 may be close personal friends or family members of the account holder 302. Additionally or alternatively, in some embodiments, one or more (or all) of the members of the coverage network 303 may be included in the same social network as the holder 302. For example, in some embodiments, the members of the coverage network 303 may also be friends with the account holder on social media. As another example, in some embodiments, one or more (or all) of the members of the coverage network 303 may also be connections of the holder 302 on social media.

In some embodiments, the transaction machine 320 and the authorization apparatus 330 are each maintained by the same financial institution. For example, in some embodiments, the holder 302 is a customer of the financial institution, the authorization apparatus 330 is embodied as an ATM transaction server maintained by the financial institution, and the transaction machine 320 is embodied as an ATM maintained by the financial institution. However, in other embodiments, the transaction machine 320 and the authorization apparatus 330 are maintained by separate entities. For example, in some embodiments, the transaction machine 320 is embodied as a POS device maintained by a merchant, and the authorization apparatus 330 is embodied as an authorization server maintained by a financial institution. In accordance with some embodiments, the mobile device 340 is associated with the holder 302 and/or is carried, owned, possessed, and/or owned by the holder 302.

As shown in FIG. 3, the transaction machine 320, the authorization apparatus 330, the mobile device 340, the mobile phone 304B, the PC 305B, and the tablet computer 306B are each operatively and selectively connected to the network 310, which may include one or more separate networks. The network 310 may include one or more payment networks (e.g., interbank networks, a credit card payment network, any wireline and/or wireless network over which payment information is sent, and the like), telephone networks (e.g., cellular networks, CDMA networks, any wireline and/or wireless network over which communications to telephones and/or mobile phones are sent, and the like), local area networks (LANs), wide area networks (WANs), global area networks (GANs) (e.g., the Internet, and the like), and/or one or more other telecommunications networks. For example, in some embodiments, the network 310 includes a telephone network (e.g., for communicating with the mobile device 340, mobile phone 304B, PC 305B, tablet computer 306B, and the like) and a payment network (e.g., for communicating with the transaction machine 320, and the like). It will also be understood that the network 310 may be secure and/or unsecure and may also include wireless and/or wireline technology.

The transaction machine 320 may include any apparatus described and/or contemplated herein. In addition, the transaction machine 320 may be configured to perform any function and/or any portion of any process flow described and/or contemplated herein. For example, in some embodiments, the transaction machine 320 is embodied as an ATM, POS device, self-checkout machine, vending machine, ticketing kiosk, PC, gaming device, mobile phone, and/or the like. As another example, in some embodiments, the transaction machine 320 is configured to initiate, perform, complete, and/or otherwise facilitate one or more financial and/or non-financial transactions, including, for example, purchasing, renting, selling, and/or leasing goods and/or services (e.g., groceries, stamps, tickets, gift certificates, DVDs, and the like); withdrawing cash; making deposits (e.g., cash, checks, and the like); making payments (e.g., paying telephone bills, sending remittances, and the like); accessing the Internet; and/or the like.

In some embodiments, the transaction machine 320 (and/or one or more other portions of the system 300) requires its users to authenticate themselves to the transaction machine 320 before the transaction machine 320 will initiate, perform, complete, and/or facilitate a transaction. For example, in some embodiments, the transaction machine 320 (and/or the transaction application 327) is configured to authenticate a transaction machine user based at least partially on an ATM/debit/credit card, loyalty/rewards/club card, smart card, token (e.g., USB token, and the like), username/password, personal identification number (PIN), biometric information, and/or one or more other credentials that the user presents to the transaction machine 320. Additionally or alternatively, in some embodiments, the transaction machine 320 is configured to authenticate a user by using one-, two-, or multi-factor authentication. For example, in some embodiments, the transaction machine 320 requires two-factor authentication, such that the holder 302 must provide a valid debit card and enter the correct PIN associated with the debit card in order to authenticate the holder 302 to the transaction machine 320.

As illustrated in FIG. 3, in this example embodiment, the transaction machine 320 includes a communication interface 322, a processor 324, a memory 326 having a transaction application 327 stored therein, and a user interface 329. In such embodiments, the processor 324 is operatively and selectively connected to the communication interface 322, the user interface 329, and the memory 326.

Each communication interface described herein, including the communication interface 322, generally includes hardware, and, in some instances, software, that enables a portion of the system 300, such as the transaction machine 320, to send, receive, and/or otherwise communicate information to and/or from the communication interface of one or more other portions of the system 300. For example, the communication interface 322 of the transaction machine 320 may include a modem, network interface controller (NIC), NFC interface, network adapter, network interface card, and/or some other electronic communication device that operatively connects the transaction machine 320 to another portion of the system 300, such as, for example, the authorization apparatus 330.

Each processor described herein, including the processor 324, generally includes circuitry for implementing the audio, visual, and/or logic functions of that portion of the system 300. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the transaction application 327 of the memory 326 of the transaction machine 320.

Each memory device described herein, including the memory 326 for storing the transaction application 327 and other information, may include any computer-readable medium. For example, the memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of portions of information used by the apparatus in which it resides to implement the functions of that apparatus.

As shown in FIG. 3, the memory 326 includes the transaction application 327. It will be understood that the transaction application 327 can be operable (e.g., usable, executable, and the like) to initiate, perform, complete, and/or facilitate one or more portions of any embodiment described and/or contemplated herein, such as, for example, one or more portions of the process flows 100, 200, and/or 600 described herein and/or one or more portions of the process flows described in connection with FIGS. 4 and/or 5. For example, in some embodiments, the transaction application 327 is operable to receive transaction information associated with a transaction, where the transaction involves the holder 302, the transaction machine 320, and the holder's account. As another example, in some embodiments, the transaction application 327 is operable to determine that the holder's account does not have enough available funds and/or credit to cover the transaction amount. As another example, in some embodiments, the transaction application 327 is operable to determine that the holder's account will incur a deficiency as a result of the transaction. As still another example, in some embodiments, the transaction application 327 is operable to authorize the transaction. In some embodiments, the transaction application 327 is operable to notify the holder 302 of a deficiency associated with the transaction and/or to prompt the holder 302 to consent to completing a transaction. In some embodiments, the transaction application 327 is operable to complete the transaction at the transaction machine 320 (e.g., complete a purchase transaction, dispense cash, accept a check for deposit, and the like).

In some embodiments, the transaction application 327 is operable to enroll the account holder 302 in a financial service involving a coverage service (e.g., a coverage service). As another example, in some embodiments, the transaction application 327 is operable to prompt the holder 302 to select one or more persons for inclusion in the coverage network 303. In some of these embodiments, the transaction application 327 is further operable to enable the holder 302 to select one or more persons for inclusion in the coverage network 303. The transaction application 327 may also be operable to present, to the holder 302, one or more members of one or more of the holder's social networks, so that the holder 302 can select one or more of these members for inclusion in the coverage network 303.

Additionally or alternatively, the transaction application 327 may also be operable to prompt one or more of these selected persons to consent to being included in the coverage network 303. Further, the transaction application 327 may be operable to receive consent from one or more of these selected persons for inclusion. Still further, the transaction application 327 may be operable to assign the selected, consenting persons to the coverage network 303 (e.g., as member 1 304A, member 2 305A, and member N 306A) and/or store information associated with the coverage network 303 in the account profile 308.

In still other embodiments, the transaction application 327 may be operable to prompt one or more (or all) of the members of the coverage network 303 to consent to covering at least part of a transaction amount associated with a transaction initiated by the holder 302 and/or his account. In some of these embodiments, the transaction application 327 is operable to receive the consent of one or more of the members of the coverage network 303 and/or to authorize that transaction based at least partially on receiving that consent. In some embodiments, instead of authorizing the transaction itself, the transaction application 327 generates an authorization request for the transaction and then sends that authorization request to the authorization apparatus 330 for consideration.

In some embodiments, where the transaction machine 320 includes an ATM, the transaction application 327 is configured to execute on the ATM in order to initiate, perform, complete, and/or facilitate, for example, one or more cash withdrawals, deposits, and/or the like. In other embodiments, where the transaction machine 320 includes a POS device, the transaction application 327 is configured to execute on the POS device in order to initiate, perform, complete, and/or facilitate, for example, one or more debit card and/or credit card transactions. In still other embodiments, where the transaction machine 320 includes a personal computer, the transaction application 327 is configured to execute on the personal computer, and, in some embodiments, the transaction application 327 is embodied as a web browser (i.e., for navigating the Internet, and the like) that is operable to initiate, perform, complete, and/or otherwise facilitate one or more financial and/or non-financial transactions.

In some embodiments, the transaction application 327 is operable to enable the holder 302 and/or transaction machine 320 to communicate with one or more other portions of the system 300, and/or vice versa. In some embodiments, the transaction application 327 is additionally or alternatively operable to initiate, perform, complete, and/or otherwise facilitate one or more financial and/or non-financial transactions. In some embodiments, the transaction application 327 includes one or more computer-executable program code portions for causing and/or instructing the processor 324 to perform one or more of the functions of the transaction application 327 and/or transaction machine 320 described and/or contemplated herein. In some embodiments, the transaction application 327 includes and/or uses one or more network and/or system communication protocols.

As shown in FIG. 3, the transaction machine 320 also includes the user interface 329. It will be understood that the user interface 329 (and any other user interface described and/or contemplated herein) can include and/or be embodied as one or more user interfaces. It will also be understood that, in some embodiments, the user interface 329 includes one or more user output devices for presenting information and/or one or more items to the transaction machine user (e.g., the holder 302, and the like), such as, for example, one or more displays, speakers, receipt printers, dispensers (e.g., cash dispensers, ticket dispensers, merchandise dispensers, and the like), and/or the like. In some embodiments, the user interface 329 additionally or alternatively includes one or more user input devices, such as, for example, one or more buttons, keys, dials, levers, directional pads, joysticks, keyboards, mouses, accelerometers, controllers, microphones, touchpads, touchscreens, haptic interfaces, styluses, scanners, biometric readers, motion detectors, cameras, card readers (e.g., for reading the magnetic strip on magnetic cards such as ATM, debit, credit, and/or bank cards, and the like), deposit mechanisms (e.g., for depositing checks and/or cash, and the like), and/or the like for receiving information from one or more items and/or from the transaction machine user (e.g., the holder 302, and the like). In some embodiments, the user interface 329 and/or the transaction machine 320 includes one or more vaults, security sensors, locks, and/or anything else typically included in and/or near the transaction machine.

As shown in FIG. 3, the system 300 also includes an authorization apparatus 330. The authorization apparatus 330 may include any apparatus described and/or contemplated herein. In addition, the authorization apparatus 330 may be configured to perform any function and/or any portion of any process flow described and/or contemplated herein. In some embodiments, the authorization apparatus 330 includes and/or is embodied as one or more servers, engines, mainframes, personal computers, ATMs, network devices, front end systems, back end systems, and/or the like. In some embodiments, such as the one illustrated in FIG. 3, the authorization apparatus 330 includes a communication interface 332, a processor 334, and a memory 336, which includes an authorization application 337 and an account datastore 338 stored therein. As shown, the communication interface 332 is operatively and selectively connected to the processor 334, which is operatively and selectively connected to the memory 336.

The authorization application 337 can be operable (e.g., usable, executable, and the like) to initiate, perform, complete, and/or facilitate any one or more portions of the process flows 100, 200, and/or 600 described herein and/or one or more portions of the process flows described in connection with FIGS. 4 and/or 5. For example, in some embodiments, the authorization application 337 is operable to receive transaction information associated with a transaction, where the transaction involves the holder 302, the transaction machine 320, and the holder's account. As another example, in some embodiments, the authorization application 337 is operable to determine that the holder's account does not have enough available funds and/or credit to cover a transaction amount associated with the transaction. As another example, in some embodiments, the authorization application 337 is operable to determine that the holder's account will incur a deficiency as a result of the transaction. As still another example, in some embodiments, the authorization application 337 is operable to authorize the transaction. In some embodiments, the authorization application 337 is operable to instruct the transaction machine 320 to complete the transaction at the transaction machine 320 (e.g., complete a purchase transaction, dispense cash, accept a check for deposit, and the like).

In some embodiments, the authorization application 337 is operable to enroll the account holder 302 in a financial service involving a coverage network. As another example, in some embodiments, the authorization application 337 is operable to prompt the holder 302 to select one or more persons for inclusion in the coverage network 303. In some of these embodiments, the authorization application 337 is further operable to enable the holder 302 to select one or more persons for inclusion in the coverage network 303. The authorization application 337 may also be operable to present, to the holder 302, one or more members of one or more of the holder's social networks, so that the holder 302 can select one or more of these members for inclusion in the coverage network 303.

Additionally or alternatively, the authorization application 337 may also be operable to prompt one or more of these selected persons to consent to being included in the coverage network 303. Further, the authorization application 337 may be operable to receive consent from one or more of these selected persons for inclusion. Still further, the authorization application 337 may be operable to assign the selected, consenting persons to the coverage network 303 and/or store information associated with the coverage network 303 in the account profile 308.

In still other embodiments, the authorization application 337 may be operable to prompt one or more (or all) of the members of the coverage network 303 to consent to covering at least part of a transaction amount associated with a transaction initiated by the holder 302 and/or his account. In some of these embodiments, the authorization application 337 is operable to receive the consent of one or more of the members of the coverage network 303 and/or to authorize the transaction based at least partially on receiving that consent. In some embodiments, the authorization application 337 is operable to receive, consider, approve, and/or decline one or more authorization requests.

As another example, in some embodiments, the authorization application 337 is operable to generate and/or send disclosure information to the holder 302, where the disclosure information defines one or more terms of a financial service involving a coverage network. In some embodiments, the authorization application 337 generates and/or sends this disclosure information to the holder 302 (and/or to the members 304A-306A) prior to the holder 302 initiating and/or engaging in a transaction at the transaction machine 320. Also, in some embodiments, the authorization application 337 is further operable to prompt the members of the coverage network 303 (e.g., via the devices 304B-306B) to agree to the one or more terms of the financial service defined in the disclosure information. In some embodiments, the members are prompted in this way during the transaction and/or while the holder 302 is still at the transaction machine 320. In some embodiments, the authorization application 337 is operable to send a confirmation message to each consenting member of the coverage network 303 that confirms that member's consent to covering at least part of the transaction amount. In some embodiments, the authorization application 337 is operable to perform one or more of these (and/or other) functions, such that a financial institution may comply with one or more government regulations (e.g., Regulation E in the United States, and the like).

In some embodiments, the authorization application 337 is operable to enable the authorization apparatus 330 to communicate with one or more other portions of the system 300, such as, for example, the account datastore 338, the mobile device 340, the transaction machine 320, the mobile phone 304B, the PC 305B, the tablet computer 306B, and/or vice versa. In addition, in some embodiments, the authorization application 337 is operable to initiate, perform, complete, and/or otherwise facilitate one or more financial and/or non-financial transactions. In some embodiments, the authorization application 337 includes one or more computer-executable program code portions for causing and/or instructing the processor 334 to perform one or more of the functions of the authorization application 337 and/or the authorization apparatus 330 that are described and/or contemplated herein. In some embodiments, the authorization application 337 includes and/or uses one or more network and/or system communication protocols.

In addition to the authorization application 337, the memory 336 also includes the account datastore 338. It will be understood that the account datastore 338 can be configured to store any type and/or amount of information. As shown, the account datastore 338 stores the account profile 308, which includes account information 308A and coverage network information 308B. The account information 308A may include any information associated with the account held by the holder 302, including, for example, transaction information associated with one or more transactions involving the account (e.g., date/time, description, transaction amount, merchant category codes, and the like), information associated with one or more account holders (e.g., holder 302), information associated with one or more account preferences, billing information, and/or the like. The coverage network information 308B may include any information associated with the coverage network 303, including for example, the names of each of the members of the coverage network 303, the contact information for each of the members (e.g., phone numbers, email addresses, physical addresses, and the like), account information for each of the members (e.g., routing number, account number, passwords, and the like), whether the members have consented to being included in the coverage network 303, whether the members have consented to covering at least part of a transaction amount (e.g., deficiency) incurred by the account, and/or the like.

In addition to the account profile 308, the account datastore 338 can include information associated with one or more accounts, account profiles, transaction machines, transaction machine users, transactions, deficiencies, coverage networks, members of coverage networks, mobile devices, financial services, authorization requests, government regulations, and/or the like. In some embodiments, the account datastore 338 may also store any information related to providing a financial service using a coverage network. In some embodiments, the account datastore 338 additionally or alternatively stores information associated with one or more electronic banking services (e.g., online banking, mobile banking, text banking, and the like).

Also, the account datastore 338 may include any one or more storage devices, including, but not limited to, datastores, databases, and/or any of the other storage devices typically associated with a computer system. It will also be understood that these datastores may store information in any known way, such as, for example, by using one or more computer codes and/or languages, alphanumeric character strings, data sets, figures, tables, charts, links, documents, and/or the like. Further, in some embodiments, the account datastore 338 includes information associated with one or more applications, such as, for example, the authorization application 337 and/or the transaction application 327. In some embodiments, the account datastore 338 provides a real-time or near real-time representation of the information stored therein, so that, for example, when the processor 334 accesses the account datastore 338, the information stored therein is current or nearly current. Although not shown, in some embodiments, the transaction machine 320, the mobile device 340, the mobile phone 304B, the PC 305B, and/or the tablet computer 306B may each include a datastore that is configured to store information associated with those respective apparatuses. It will be understood that these datastores can store information in any known way, can include information associated with anything shown in FIG. 3, and/or can be configured similar to the account datastore 338.

It will be understood that the embodiment illustrated in FIG. 3 is exemplary and that other embodiments may vary. For example, in some embodiments, some or all of the portions of the system 300 are combined into a single portion. Specifically, in some embodiments, the transaction machine 320 and the authorization apparatus 330 are combined into a single transaction and authorization apparatus that is configured to perform all of the same functions of those separate portions as described and/or contemplated herein. Likewise, in some embodiments, some or all of the portions of the system 300 are separated into two or more distinct portions. For example, in some alternative embodiments, the system 300 may further include a user interface apparatus (e.g., PC, mobile phone, and the like) that is separate from the transaction machine 320, where the user interface apparatus is configured to enable the holder 302 to open the account, enroll the account in a coverage service, select one or more persons for inclusion in the coverage network 303, and so on.

The system 300 and/or one or more portions of the system 300 may include and/or implement any embodiment of the present invention described and/or contemplated herein. For example, in some embodiments, the system 300 (and/or one or more portions of the system 300) is configured to implement any one or more embodiments of the process flow 100 described and/or contemplated herein in connection with FIG. 1, any one or more embodiments of the process flow 200 described and/or contemplated herein in connection with FIG. 2, any one or more embodiments of the process flow described and/or contemplated herein in connection with FIG. 4, any one or more embodiments of the process flow described and/or contemplated herein in connection with FIG. 5, and/or any one or more embodiments of the process flow 600 described and/or contemplated herein in connection with FIG. 6.

As a specific example, in accordance with an embodiment of the present invention, the authorization apparatus 330 is configured to: (a) receive transaction information associated with a transaction, where the transaction involves the holder 302, the transaction machine 320, and the holder's account 308, and where the transaction has a transaction amount, as represented by block 110 in FIG. 1; (b) determine, based at least partially on the transaction information, that the account does not have enough available funds and/or credit to cover the transaction amount, as represented by block 120; (c) prompt a member (e.g., one or more (or all) of the members 304A-306A) of the coverage network 303 to consent (e.g., via one or more (or all) of the devices 304B-306B) to covering at least part of the transaction amount, as represented by block 130; (d) receive the member's consent to covering at least part of the transaction amount, as represented by block 140; and (e) authorize the transaction based at least partially on receiving the member's consent, as represented by block 150. In accordance with some embodiments, the transaction machine 320, the authorization apparatus 330, the mobile device 340, the mobile phone 304B, the PC 305B, and/or the tablet computer 306B are each configured to send and/or receive one or more instructions to and/or from each other, such that an instruction sent, for example, from the authorization apparatus 330 to the transaction machine 320 (and/or vice versa) can trigger the transaction machine 320 (and/or vice versa) to perform one or more portions of any one or more of the embodiments described and/or contemplated herein.

Referring now to FIG. 4, a mixed block and flow diagram of a system 400 for establishing a coverage network for use in a coverage service is provided, in accordance with an exemplary embodiment of the present invention. It will be understood that the system 400 illustrated in FIG. 4 represents an example embodiment of the process flow 200 described in connection with FIG. 2 and/or an example embodiment of the system 300 described in connection with FIG. 3. As shown, the system 400 includes a personal computer 401 (e.g., the transaction machine 320) accessible to an account holder (e.g., the holder 302), an account server 403 (e.g., the authorization apparatus 330), and a mobile phone 405 (e.g., the mobile device 304B) accessible to a person who becomes a member of the holder's coverage network. The personal computer 401, the account server 403, and the mobile phone 405 may each include a communication interface, a user interface, a processor, a memory, an application, and/or a datastore, and those devices may be operatively connected to each other.

In accordance with some embodiments, the personal computer 401 and mobile phone 405 are each operatively and selectively connected to the account server 403 via one or more networks (not shown). For example, in some embodiments, the personal computer 401 is operatively connected to the account server 403 via the Internet, and/or the mobile phone 405 is operatively connected to the account server 403 via a telephone network. Also, in this example embodiment, the holder is a customer of a financial institution, and the personal computer 401 is accessible to the holder. Also, in this example embodiment, the personal computer 401 is maintained by the holder, the mobile phone 405 is maintained by the member, and the account server 403 is maintained by the financial institution. Further, in accordance with some embodiments, the financial institution maintains the account held by the holder and mentioned in FIG. 4.

As represented by block 402, the holder uses his personal computer 401 to login to his account (e.g., via an online banking service) and/or enroll his account in a coverage service that uses a coverage network and is provided by the financial institution. Next, as represented by block 404, the account server 403 prompts the holder to add people from the holder's one or more previously-established social networks to his coverage network. For example, in some embodiments, the account server 403 asks the holder if the holder would like to add one or more of his friends from social media to his coverage network. In such embodiments, if the holder agrees, the server 403 may be configured to import the holder's friends from social media and/or enable the holder to select one or more of those friends for inclusion in the holder's coverage network. In some embodiments, the person(s) selected by the holder for inclusion in the holder's coverage network are family members or close personal friends of the holder.

After being prompted, the holder selects a person from his previously-established social network for inclusion in his coverage network, as represented by block 406. Although FIG. 4 describes one selected person for simplicity, it will be understood that: (a) more than one person may be selected by the holder for inclusion in the holder's coverage network; (b) more than one person may consent to being added to the holder's coverage network; (c) one or more of the persons selected by the holder for inclusion may not consent to being included; and (d) more than one person may be added to the holder's coverage network.

After the holder selects the person for inclusion in his coverage network, the account server 403 generates and/or sends (and/or instructs a fulfillment apparatus to send) a message to the selected member, as represented by block 408. In some embodiments, the message is a social network-specific message (e.g., social media message, social media direct message, and the like) that: (a) notifies the selected person that she was selected by the holder for inclusion in the holder's coverage network; and (b) prompts the selected person to consent to being included in the holder's coverage network. After the selected person is prompted, the selected person may send a social network-specific message to the account server 403, where the message indicates that the selected person consents to being included in the holder's coverage network, as represented by block 410.

After the account server 403 receives the selected person's consent, the server 403 adds the selected, consenting person as a member of the holder's coverage network, as represented by block 412. In addition, the account server 403 is configured to store information associated with the newly-added member in the holder's account profile, as represented by block 414. For example, in some embodiments, the server 403 may store the member's name and contact information (e.g., phone number, address, email address, and the like) in the holder's account profile. Additionally or alternatively, in some embodiments, the server 403 may store the member's account information (e.g., routing number, account number, account password, and the like), so that the member's account may be debited if the member later consents to covering at least part of a transaction amount incurred by the holder's account. Of course, it will be understood that some or all of the information about the member may not be publicly available and/or available to the holder. For example, in some embodiments, the member's account number is viewable only by financial institution personnel and not by the holder (or anyone else).

In addition to adding the selected, consenting person as a member of the coverage network, the account server 403 is also configured to generate and/or send an email to the holder, where the email: (a) can be received at the personal computer 401; and (b) indicates to the holder that the selected person has consented to becoming a member of the holder's coverage network, as represented by block 416. Additionally or alternatively, as represented by block 418, the account server 403 is configured to generate and/or send a confirmation message to the member, where the confirmation message: (a) can be received at the member's mobile phone 405; and (b) indicates that the member has been added to the holder's coverage network.

Of course, the embodiment illustrated in FIG. 4 is merely exemplary and other embodiments may vary without departing from the scope and spirit of the present invention. For example, in some alternative embodiments, one or more portions of the process flow being performed by the account server 403 are performed instead by the holder's personal computer 401. As another example, in some alternative embodiments, the selected person/potential member is sent a different type of message (e.g., text message, email, mobile banking-specific message, and the like) instead of a social network-specific message. As another example, in some alternative embodiments, the member provides her contact information and/or account information to the server 403 when or after the member consents to being included in the holder's coverage network.

Also, in some embodiments, one or more of the portions of the process flow represented by blocks 402-418 are triggered by one or more triggering events, which, in some embodiments, include the performance of one or more of the other portions of the process flow represented by blocks 402-418. Also, in some embodiments, the system 400 is configured to perform the entire process flow represented by blocks 402-418, from start to finish, within moments, seconds, and/or minutes. For example, in some embodiments, the member consents to being included in the holder's coverage network within approximately two minutes of the holder selecting (and/or the account server 403 determining that the holder has selected) the member. Further, it will be understood that one or more portions of the process flow represented by blocks 402-418 are configured to comply with one or more requirements of a government regulation (e.g., Regulation E and/or the CARD Act in the United States).

Referring now to FIG. 5, a mixed block and flow diagram of a system 500 for implementing a coverage service involving a coverage network is provided, in accordance with an exemplary embodiment of the present invention. It will be understood that the system 500 illustrated in FIG. 5 represents an example embodiment of the process flow 200 described in connection with FIG. 2 and/or an example embodiment of the system 300 described in connection with FIG. 3. As shown, the system 500 includes a POS device 501 (e.g., the transaction machine 320, a merchant terminal), an authorization server 503 (e.g., the authorization apparatus 330), a mobile phone 505 (e.g., the mobile device 340) accessible to an account holder (e.g., the holder 302), and a mobile phone 507 (e.g., the mobile phone 304B) accessible to a member (e.g., the member 304A) of the holder's coverage network (e.g., the coverage network 303). In some embodiments, the member is a family member of the holder and/or is a member of the holder's previously-established social network. Also, it will be understood that the POS device 501, the authorization server 503, the mobile phone 505, and the mobile phone 507 may each include a communication interface, a user interface, a processor, a memory, an application, and/or a datastore, and those devices may be operatively connected to each other.

In accordance with some embodiments, the POS device 501, mobile phone 505, and mobile phone 507 are each operatively and selectively connected to the authorization server 503 via one or more networks (not shown). For example, in some embodiments, the POS device 501 is operatively connected to the authorization server 503 via a payment network, and/or the mobile phone 505 and mobile phone 507 are operatively connected to the authorization server 503 via a telephone network. Also, in this example embodiment, the holder is a customer of a financial institution, and the POS device 501 is accessible to the holder. Also, in this example embodiment, the POS device 501 is maintained by a merchant, the mobile phone 505 is maintained by the holder, the mobile phone 507 is maintained by the member, and the authorization server 503 is maintained by the financial institution. Further, in accordance with some embodiments, the financial institution maintains the checking account held by the holder and associated with the debit card mentioned below.

As represented by block 502, the holder swipes a debit card at the POS device 501 to engage in a debit card transaction involving the holder and the merchant. Although not shown, the POS device 501 may also authenticate the holder based at least partially on one or more credentials the holder provides to the POS device 501 (e.g., based on the debit card swiped, and the like). Next, as represented by block 504, the POS device 501 generates and sends an authorization request associated with the debit card transaction to the authorization server 503. In accordance with some embodiments, the authorization request includes information that, for example, identifies the holder, the checking account associated with the debit card, the amount of the transaction, the one or more goods and/or services involved in the transaction, and/or the like. As represented by block 506, the authorization server 503 then determines that the checking account associated with the debit card does not have enough available funds to cover the transaction amount. In this example embodiment, after making the deficiency determination, the authorization server 503 declines the authorization request, as represented by block 508. Also, as represented by block 510, the authorization server 503 determines that the holder (and/or the checking account) is enrolled in a coverage service provided by the financial institution. Thereafter, as represented by block 512, the authorization server 503 identifies a member of the holder's coverage network by, for example, accessing an account datastore having information associated with the checking account and/or coverage network stored therein. Although not shown, the authorization server 503 may also identify the contact information (e.g., phone number, email address, and the like) for the identified member.

After the authorization server 503 identifies the member of the holder's coverage network, the authorization server 503 sends a text message (e.g., SMS message, MMS message, EMS message, and the like) to the member, as represented by block 514. In some embodiments, the text message: (a) notifies the member of the holder's (potential) deficiency; and (b) prompts the member to consent to covering the deficiency. In some embodiments, the text message received by the mobile phone 505 is delivered visually to the member via a display of the mobile phone 505. For example, in some embodiments, the text message identifies the merchant involved in the transaction, the amount of the transaction, where the transaction occurred, and/or otherwise describes the transaction. As another example, in some embodiments, the text message explains that the member is being asked to consent to covering the holder's deficiency. Further, in some embodiments, the text message presents two selectable, digital buttons entitled "I Consent" and "I Do Not Consent," which may be used by the member to indicate (e.g., to the authorization server 403) whether the member consents to covering the deficiency.

After reading the text message at the mobile phone 505, the member sends, via a second text message, his consent to covering the deficiency back to the authorization server 503, as represented by block 516. For example, in some embodiments, the customer sends a "Yes" SMS message to a financial institution phone number, where the phone number was provided in the SMS message originally sent from the authorization server 503. As another example, in some embodiments, the holder selects a selectable, digital button entitled "I Consent" to communicate his consent to covering the deficiency. In some embodiments, by consenting to covering the deficiency, the member agrees to pay for the holder's deficiency (and/or any related assessment) using funds and/or credit from the member's account. In some of these embodiments, because the holder consents to covering the deficiency and/or any related assessment, the holder's account does not actually incur the deficiency as a result of the transaction. Instead, in such embodiments, the holder's available funds are combined with the deficiency funds provided by the member to cover the entire transaction amount of the transaction.

After the member consents to covering the deficiency, the authorization server 503 stores the member's consent in a datastore, as represented by block 518. In addition, as represented by block 520, the authorization server 503 sends a text message to the holder's mobile phone 507, where the text message: (a) notifies the holder of the member's consent; and (b) prompts the holder to re-swipe the debit card at the POS device 501 to complete the transaction. Thereafter, the holder re-swipes the debit card at the POS device 501, as represented by block 522. In some embodiments, the holder re-swiping his debit card at the POS device 501 serves to indicate that the holder consents to completing the transaction. In some embodiments, the holder's consent to completing the transaction and/or the member's consent to covering the deficiency are required to comply with a government regulation (e.g., Regulation E).

After the holder re-swipes, the POS device 501 generates and sends another authorization request to the authorization server 503, as represented by block 524, which is then approved by the authorization server 503, as represented by block 526. In some embodiments, the authorization server 503 approves the second authorization request based at least partially on receiving the member's consent and/or based at least partially on the holder re-swiping his debit card at the POS device 501. After the second authorization request has been approved, the transaction is completed at the POS device 501, as represented by block 528. It will be understood that, in some embodiments, the first authorization request, as represented by block 504, represents the first attempt to complete the transaction referred to in block 502, and the second authorization request, as represented by block 524, represents a second attempt to complete the same transaction.

Of course, the embodiment illustrated in FIG. 5 is merely exemplary and other embodiments may vary without departing from the scope and spirit of the present invention. For example, in some alternative embodiments, the first authorization request is not declined by the authorization server 503, the holder is not required to re-swipe the debit card at the POS device 501, and the second authorization request is never sent. Instead, in such embodiments, after receiving the member's consent to covering the deficiency, the authorization server 503 is configured to approve the first authorization request referred to in block 504, and the transaction is completed at the POS device 501. As another example, in some alternative embodiments, one or more portions of the process flow being performed by the mobile phone 505 are performed instead by the POS device 501. As still another example, in some alternative embodiments of the present invention, instead of involving a debit card, a checking account, and/or a debit card transaction, the process flow shown in FIG. 4 involves a credit card, a credit card account, and/or a credit card transaction.

As another example, in some alternative embodiments, the holder is notified of the deficiency and/or that the member of the coverage network is being contacted regarding the deficiency. In some of these embodiments, the holder is notified in this way after the authorization request is declined but before the second authorization request is approved. Also, in some embodiments, the holder may be able to send a personalized message to the member of the coverage network after being notified of the deficiency and/or that the member is being contacted. Still further, in some embodiments, after being notified of the deficiency, the holder may be able to indicate his intention (e.g., via a text message) to the authorization server 503 that he does not wish the member to be contacted regarding the deficiency and/or that he does not wish to complete the transaction (i.e., other than by not re-swiping the debit card at the POS device 501).

As another example, in some alternative embodiments, the text message generated and/or sent to the member is also generated and/or sent to one or more other members of the holder's coverage network. In such embodiments, the server 503 may be configured to authorize the transaction if one or more of the members consent to covering, either individually or collectively, the entire amount of the deficiency and/or any related assessment. As another example, in some alternative embodiments, the authorization server 503 is configured to debit the member's account by the amount of the deficiency, either before or after the transaction is authorized. In some of these embodiments, where the member's account is debited after the transaction is authorized, the server 503 may be configured to provide the holder's account with funds from the financial institution until the financial institution can be reimbursed by debiting the member's account.

As another example, in some alternative embodiments, one or more (or all) of the text messages referred to in blocks 514, 516, and 520 may be some other type of message, such as, for example, a social network-specific message (e.g., social media message). In some of these embodiments, the member and the holder are members of the same social network. Further, in some embodiments, instead of a text message, the message referred to in block 514 is a social media message that is posted to the wall of the holder's social media account, such that each of the holder's social media friends may view the message and/or be prompted to cover at least part of the deficiency. In other embodiments, instead of a text message, the message referred to in block 514 is a social media message that is posted to the holder's social media feed, such that each of the holder's social media followers may view the message and/or be prompted to cover at least part of the deficiency.

Also, in some embodiments, one or more of the portions of the process flow represented by blocks 502-528 are triggered by one or more triggering events, which, in some embodiments, include the performance of one or more of the other portions of the process flow represented by blocks 502-528. Also, in some embodiments, the system 500 is configured to perform the entire process flow represented by blocks 502-528, from start to finish, within moments, seconds, and/or minutes. For example, in some embodiments, the member consents to the covering the deficiency within approximately two minutes of the authorization server 503 determining that the account does not have enough available funds to cover the transaction amount. Further, it will be understood that one or more portions of the process flow represented by blocks 502-528 are configured to comply with one or more requirements of a government regulation (e.g., Regulation E and/or the CARD Act in the United States).

Many embodiments of the present invention described herein involve a member of a coverage network consenting to covering at least part of a transaction amount after the transaction associated with that transaction amount has been initiated. However, it will be understood that other embodiments of the present invention additionally or alternatively enable a member of a coverage network to consent to covering at least part of a transaction amount in advance (i.e., before the transaction associated with that transaction amount is initiated). Some of these embodiments are described below in connection with FIG. 6 and the process flow 600.

Referring now to FIG. 6, a process flow 600 is shown for providing a financial service involving a coverage network, where a member of the coverage network consents to covering at least part of a future transaction amount, in accordance with an embodiment of the present invention. In some embodiments, the process flow 600 is performed by an apparatus having hardware and/or software configured to perform one or more portions of the process flow 600. In such embodiments, as represented by block 610, the apparatus is configured to receive, from a member of a coverage network, consent to covering at least part of a future transaction amount, where the future transaction amount is associated with a future transaction involving an account, where the account is held by a holder, and where the coverage network is associated with the holder or the account. As represented by block 620, the apparatus is also configured to receive transaction information associated with a transaction, where the transaction has a transaction amount and involves the account, and where the transaction is initiated after the apparatus receives the member's consent. As represented by block 630, the apparatus is further configured to determine that the account does not have enough available funds or credit to cover the transaction amount. As represented by block 640, the apparatus is also configured to authorize the transaction based at least partially on receiving the member's consent. Accordingly, it will be understood that the future transaction and future transaction amount referred to in block 610 become the transaction and transaction amount referred to in block 620, respectively.

Regarding block 610, the member may consent to covering at least part of the future transaction amount at any time before the future transaction associated with that future transaction amount occurs. For example, in some embodiments, the member may provide his consent five minutes before the future transaction occurs, whereas in other embodiments, the member may provide his consent a week in advance.

Also, in some embodiments, the holder may request the member's consent before engaging in the transaction. For example, in some embodiments, the holder may realize that his account is low on funds before making a purchase. In such a case, the holder may ask the member (via the apparatus having the process flow 600) to help the holder cover that purchase by extending the holder funds (or the promise to extend funds) before the holder actually engages in the purchase transaction. In other words, the holder may request a microloan from the member before engaging in the purchase transaction that the holder knows his account cannot cover.

Said in more general terms, the apparatus having the process flow 600 is, in some embodiments, configured to: (a) receive a request, from the holder, to prompt the member to consent to covering at least part of the future transaction amount; and (b) prompt the member to consent to covering at least part of the future transaction amount, where this prompting is based at least partially on receiving the request from the holder. In other embodiments, the apparatus may prompt the member automatically and/or without receiving a request from the holder. In some of these embodiments, the apparatus is configured to: (a) determine that the holder's account balance has fallen below a predetermined balance amount; and (b) prompt the member to consent to covering at least part of a future transaction amount, where this prompting is based at least partially on the determining that the holder's account balance has fallen below the predetermined amount. For example, the apparatus may prompt the member to consent to covering a future transaction amount if the holder's account balance falls below $50.

Referring still to block 610, the member may be able to attach one or more restrictions on the member's consent. For example, in some embodiments, the member may set a limit on the future transaction amount he or she is willing to cover. As a specific example, the member may consent to covering one or more future deficiencies incurred by the holder's account, up to $50. In such embodiments, if the holder later engages in a transaction that results in a deficiency of $30 (i.e., less than $50), the transaction will be authorized based at least partially on the member's prior consent. Thus, in more general terms and in accordance with some embodiments, the apparatus having the process flow 600 is configured to receive the member's consent by receiving information indicating that the member has consented to covering a future transaction amount only if that future transaction amount is less than a predetermined amount. In some of these embodiments, the apparatus is further configured to: (a) determine that the transaction amount referred to in block 620 is less than the predetermined amount; and (b) authorize the transaction based at least partially on determining that the transaction amount is less than the predetermined amount.

The process flow 600 may be implemented by any apparatus described and/or contemplated herein, and/or by any one or more portions of the system 300 described in connection with FIG. 3. For example, in some embodiments, the process flow 600 can be performed by the apparatus having the process flow 100, meaning that the apparatus can be configured to both: (a) prompt a member to consent to covering at least part of a transaction amount after the transaction associated with that transaction amount is initiated; and/or (b) prompt the member to consent to covering at least part of a transaction amount before the transaction associated with that transaction amount is initiated. Of course, it will also be understood that the embodiment illustrated in FIG. 6 is merely exemplary and that other embodiments may vary without departing from the scope and spirit of the present invention.

In addition, the apparatus having the process flow 600 can be configured to perform one or more portions of the process flow 600 in real time, in substantially real time, and/or at one or more predetermined times. The apparatus having the process flow 600 may be configured to perform any of the portions of the process flow 600 represented by blocks 610-640 upon or after one or more triggering events (which, in some embodiments, is the performance of one or more of the other portions of the process flow 600). In addition, in some embodiments, the apparatus having the process flow 600 (and/or a user thereof) is configured to perform each portion of the process flow 600, from start to finish, within moments, seconds, and/or minutes (e.g., within approximately 1-5 minutes, and the like).

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, and the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, and the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method comprising:
receiving, using a processor, transaction information associated with a transaction, wherein the transaction involves an account, wherein the account is held by a holder, and wherein the transaction comprises a transaction amount;
determining, using a processor, based at least partially on the transaction information, that the account does not have enough available funds or credit to cover the transaction amount;

prompting, using a processor, a member of a coverage network to consent to covering at least part of the transaction amount, wherein the coverage network is associated with the account or the holder, and wherein the prompting occurs after the determining that the account does not have enough available funds or credit, wherein the member and the holder are members of the same social network provided by a particular social networking service, and wherein the prompting the member comprises prompting the member via a message specific to the particular social networking service;

receiving, using a processor, the member's consent to covering at least part of the transaction amount; and authorizing, using a processor, the transaction based at least partially on the receiving the member's consent.

2. The method of claim 1, further comprising:

prompting, prior to the transaction being initiated, the holder to select one or more persons for inclusion in the coverage network;

receiving, prior to the transaction being initiated, information indicating that the holder selected the member for inclusion in the coverage network; and assigning, prior to the transaction being initiated, the member to the coverage network based at least partially on the receiving the information.

3. The method of claim 2, wherein the prompting the holder comprises prompting the holder to select one or more persons from a social network for inclusion in the coverage network, wherein the one or more persons and the holder are members of the social network, and wherein the social network is provided by a particular social networking service.

4. The method of claim 1, further comprising:

prompting, prior to the transaction being initiated, the member to consent to being included in the coverage network;

receiving, prior to the transaction being initiated, the member's consent to being included in the coverage network; and assigning, prior to the transaction being initiated, the member to the coverage network based at least partially on the receiving the member's consent to being included in the coverage network.

5. The method of claim 1, wherein the coverage network comprises one or more other members in addition to the member, and wherein the method further comprises:

prompting each of the other members of the coverage network to consent to covering at least part of the transaction amount, wherein the prompting each of the other members occurs after the determining that the account does not have enough available funds or credit.

6. The method of claim 1, further comprising:

debiting an account held by the member based at least partially on the receiving the member's consent.

7. The method of claim 1, wherein the debiting the member's account occurs before the authorizing the transaction.

8. The method of claim 1, wherein the receiving the transaction information comprises receiving an authorization request associated with the transaction, wherein the receiving the authorization request is based at least partially on the holder presenting account information at a transaction machine involved in the transaction, the method further comprising:

declining the authorization request based at least partially on the determining that the account does not have enough available funds or credit;

prompting the holder to re-present account information at the transaction machine, wherein the prompting the holder to re-present occurs after the declining the authorization request and after the receiving the member's consent;

receiving a second authorization request associated with the transaction, wherein the receiving the second authorization request is based at least partially on the holder re-presenting the account information at the transaction machine; and approving the second authorization request based at least partially on the receiving the member's consent.

9. The method of claim 1, further comprising:

receiving second transaction information associated with a second transaction, wherein the second transaction involves a second account, wherein the second account is held by a second holder, and wherein the second transaction comprises a second transaction amount;

determining, based at least partially on the second transaction information, that the second account does not have enough available funds or credit to cover the second transaction amount;

prompting each member of a second coverage network to consent to covering at least part of the second transaction amount, wherein the second coverage network is associated with the second holder or the second account;

determining that no member of the second coverage network has consented within a predetermined period of time to covering at least part of the second transaction amount; and declining the second transaction based at least partially on the determining that no member of the second coverage network has consented within the predetermined period of time.

10. The method of claim 1, wherein the prompting the member comprises sending a first text message to a mobile phone accessible to the member, wherein the first text message prompts the member to consent to covering at least part of the transaction amount, and wherein the receiving the member's consent comprises receiving a second text message from the mobile phone, wherein the second text message indicates that the member consents to covering at least part of the transaction amount.

11. The method of claim 1, wherein the prompting the member to consent occurs within approximately thirty seconds of the determining that the account does not have enough available funds or credit.

12. The method of claim 1, wherein the prompting the member to consent comprises prompting the member to agree to one or more terms of a coverage service, and wherein the receiving the member's consent comprises receiving the member's agreement to the one or more terms of the coverage service.

13. The method of claim 1, wherein the member's consent to covering at least part of the transaction amount comprises consent to covering the entire transaction amount and any related fee.

14. The method of claim 1, wherein the coverage network comprises a second member in addition to the member, and wherein the method further comprises:

prompting the second member to consent to covering at least part of the transaction amount, wherein the prompting the second member occurs after the determining that the account does not have enough available funds or credit; and receiving the second member's consent to covering at least part of the transaction amount, and wherein the authorizing the transaction is based at least partially on the receiving the second member's consent.

15. The method of claim 1,
wherein the determining that the account does not have enough available funds or credit comprises determining that the account will incur a deficiency as a result of the transaction, and wherein the receiving the member's consent to covering at least part of the transaction amount comprises receiving the member's consent to covering only the deficiency.

16. An apparatus comprising:
a first communication interface configured to receive, via a payment network, transaction information associated with a transaction, wherein the transaction involves an account, wherein the account is held by a holder, and wherein the transaction comprises a transaction amount;
a second communication interface configured to communicate with a mobile device via a telecommunications network, wherein the mobile device is accessible to a member of a coverage network, wherein the coverage network is associated with the account or the holder, and wherein the member and the holder are members of the same social network provided by a particular social networking service; and
a processor operatively connected to the first communication interface and the second communication interface, and configured to:
determine, based at least partially on the transaction information, that the account does not have enough available funds or credit to cover the transaction amount;
instruct the second communication interface to send a message specific to the particular social networking service to the mobile device via the telecommunications network, wherein the message prompts the member to consent to covering at least part of the transaction amount, and wherein the processor instructs the second communication interface to send the message after the processor determines that the account does not have enough available funds or credit;
receive the member's consent to covering at least part of the transaction amount; and
authorize the transaction based at least partially on the processor receiving the member's consent.

17. The apparatus of claim 16, wherein the member of the coverage network was selected by the holder for inclusion in the coverage network prior to the transaction being initiated.

18. The apparatus of claim 16, wherein the member consented to being included in the coverage network prior to the transaction being initiated.

19. The apparatus of claim 16,
wherein the second communication interface is further configured to communicate with a second mobile device via the telecommunications network, wherein the second mobile device is accessible to a second member of the coverage network, and
wherein the processor is further configured to instruct the second communication interface to send a second message to the second mobile device via the telecommunications network, wherein the second message prompts the second member to consent to covering at least part of the transaction amount, and wherein the processor instructs the second communication interface to send the second message after the processor determines that the account does not have enough available funds or credit.

20. The apparatus of claim 19, wherein the second communication interface receives, from the second mobile device, information indicating that the second member does not consent to covering at least part of the transaction amount.

21. The apparatus of claim 16, wherein the processor is further configured to debit an account held by the member based at least partially on the processor receiving the member's consent.

22. The apparatus of claim 21, wherein the processor is configured to debit the member's account before authorizing the transaction.

23. The apparatus of claim 16,
wherein the first communication interface receives the transaction information by receiving an authorization request associated with the transaction,
wherein the first communication interface receives the authorization request based at least partially on the holder presenting account information at a transaction machine involved in the transaction,
wherein the processor is further configured to:
decline the authorization request based at least partially on the processor determining that the account does not have enough available funds or credit; and
instruct the second communication interface to send a second message to the mobile device via the telecommunications network, wherein the second message prompts the holder to re-present account information at the transaction machine, wherein the processor instructs the second communication interface to send the second message after the processor declines the authorization request and receives the member's consent,
wherein the first communication interface is configured to receive a second authorization request associated with the transaction, wherein the first communication interface receives the second authorization request based at least partially on the holder re-presenting the account information at the transaction machine, and
wherein the processor is further configured to approve the second authorization request based at least partially on the processor receiving the member's consent.

24. The apparatus of claim 16,
wherein the first communication interface is further configured to receive, via the payment network, second transaction information associated with a second transaction, wherein the second transaction comprises a second transaction amount and involves the account, and
wherein the processor is further configured to:
determine, based at least partially on the second transaction information, that the account does not have enough available funds or credit to cover the second transaction amount;
instruct the second communication interface to prompt each member of the coverage network to consent to covering at least part of the second transaction amount;
determine that no member of the coverage network has consented within a predetermined period of time to covering at least part of the second transaction amount; and
decline the second transaction based at least partially on determining that no member of the coverage network has consented within the predetermined period of time.

25. The apparatus of claim 16, wherein the coverage network comprises a second member in addition to the member, and wherein the processor is further configured to:
- instruct the second communication interface to prompt the second member to consent to covering at least part of the transaction amount, wherein the processor instructs the second communication interface after the determining that the account does not have enough available funds or credit; and
- receive the second member's consent to covering at least part of the transaction amount, and
- wherein the processor authorizes the transaction based at least partially on receiving the second member's consent.

26. The apparatus of claim 16, wherein the processor:
- determines that the account does not have enough available funds or credit by determining that the account will incur a deficiency as a result of the transaction,
- receives the member's consent to covering at least part of the transaction amount by receiving the member's consent to covering only the deficiency, and
- authorizes the transaction based at least partially on the processor receiving the member's consent to covering only the deficiency.

* * * * *